No. 809,075. PATENTED JAN. 2, 1906.
A. RECHNITZER.
CALCULATOR.
APPLICATION FILED JUNE 29, 1901.
8 SHEETS—SHEET 1.
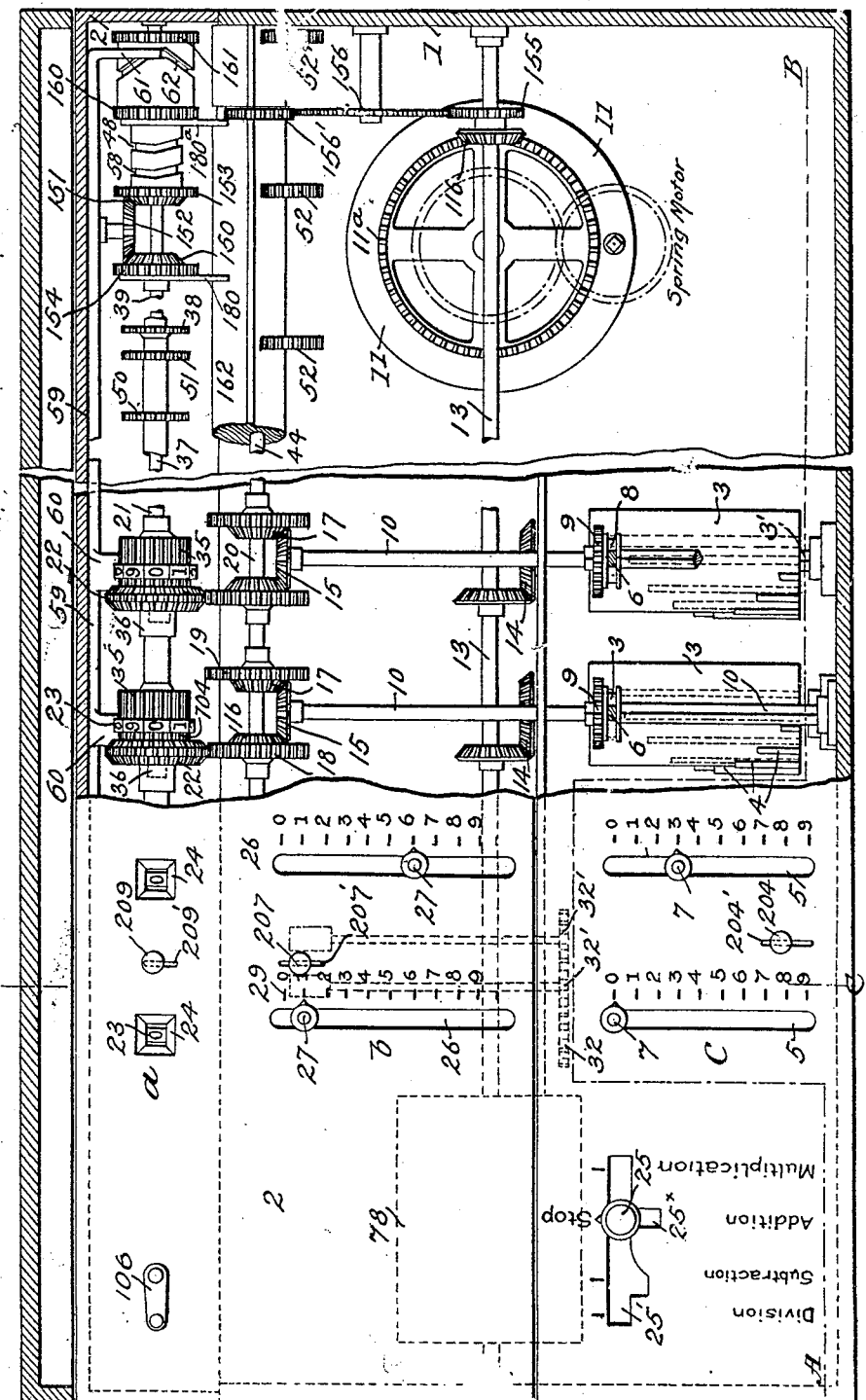
Fig. I.
Witnesses: Inventor:

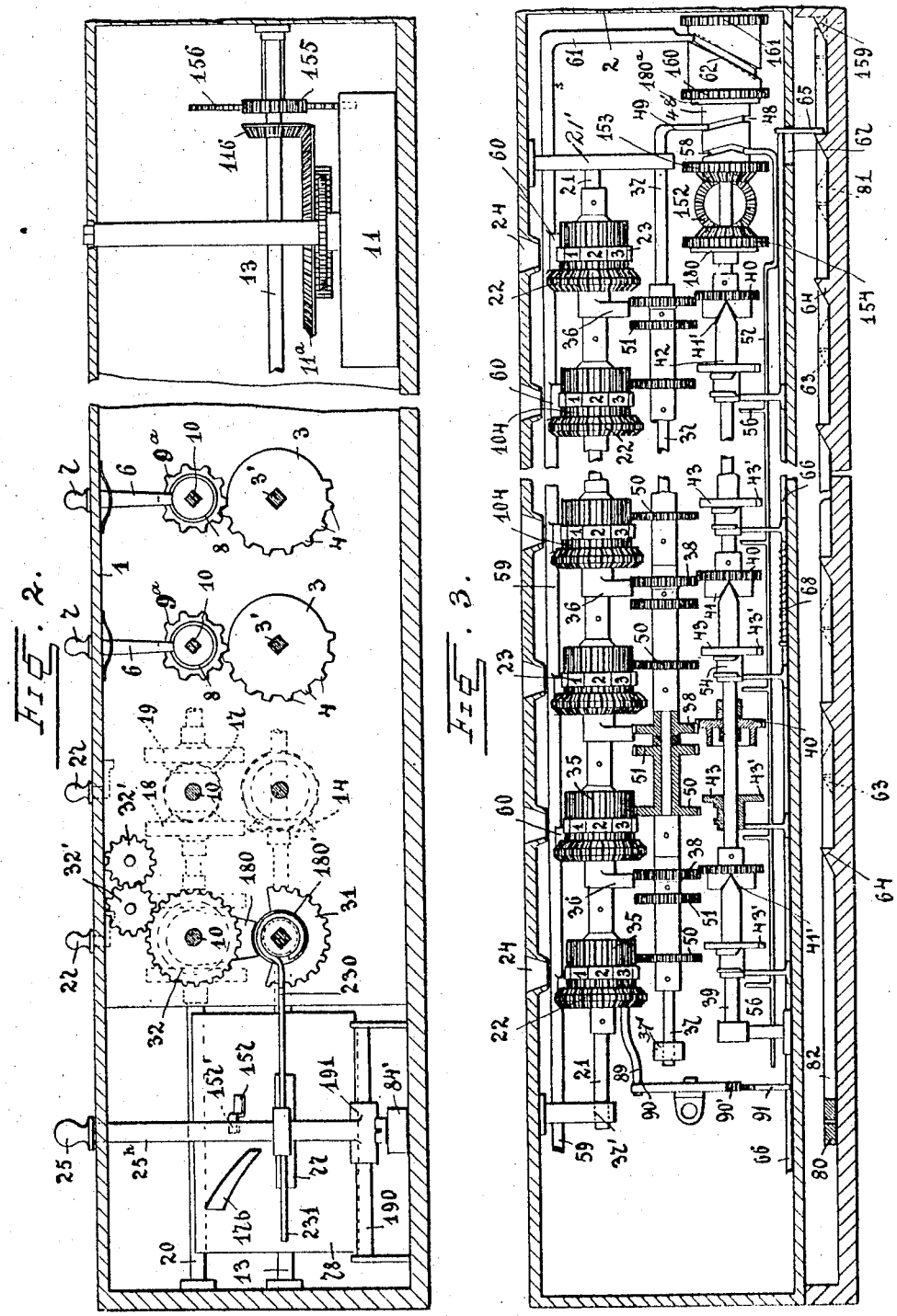

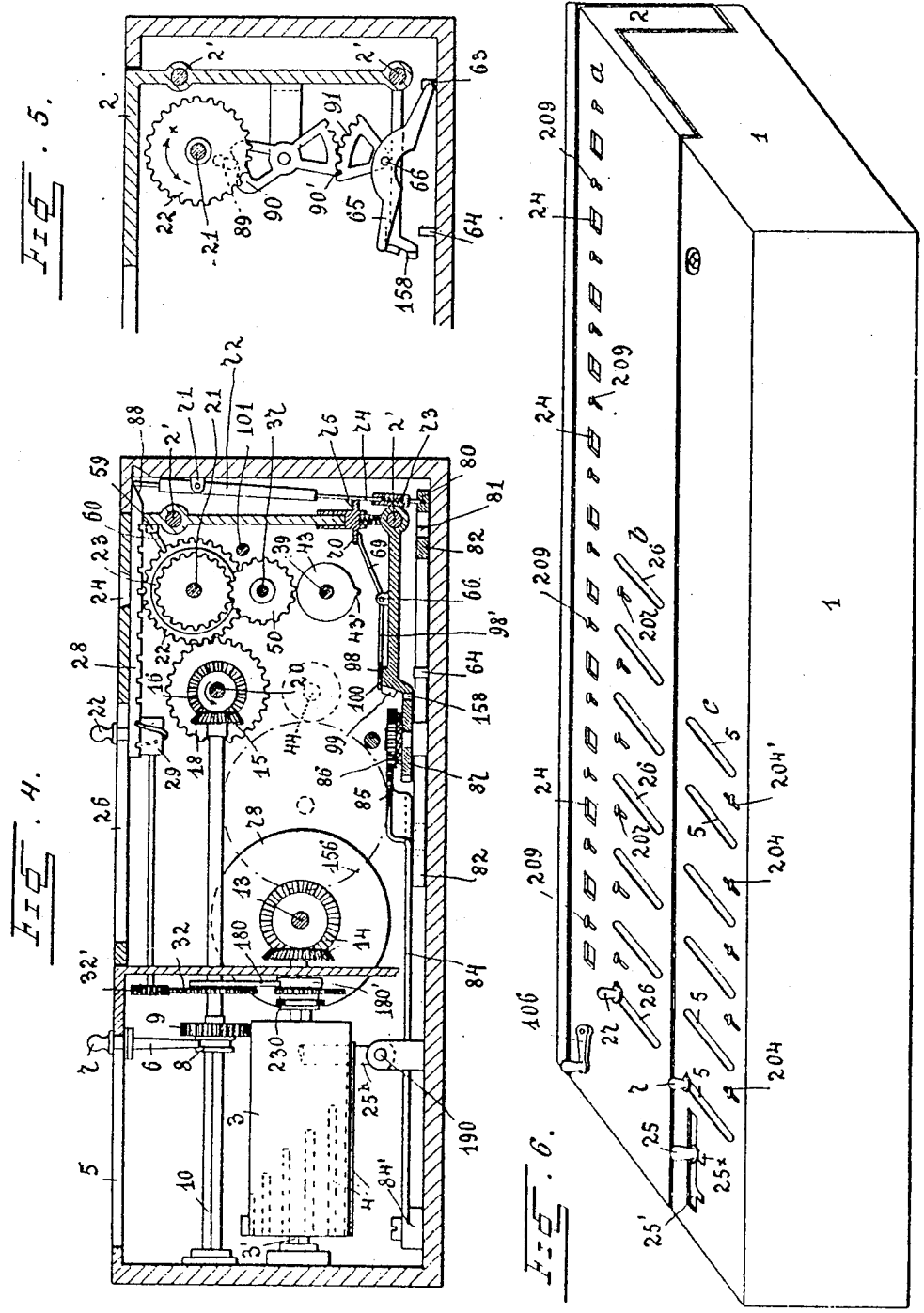
No. 809,075. PATENTED JAN. 2, 1906.
A. RECHNITZER.
CALCULATOR.
APPLICATION FILED JUNE 29, 1901.
8 SHEETS—SHEET 3.

No. 809,075. PATENTED JAN. 2, 1906.
A. RECHNITZER.
CALCULATOR.
APPLICATION FILED JUNE 29, 1901.
8 SHEETS—SHEET 4.
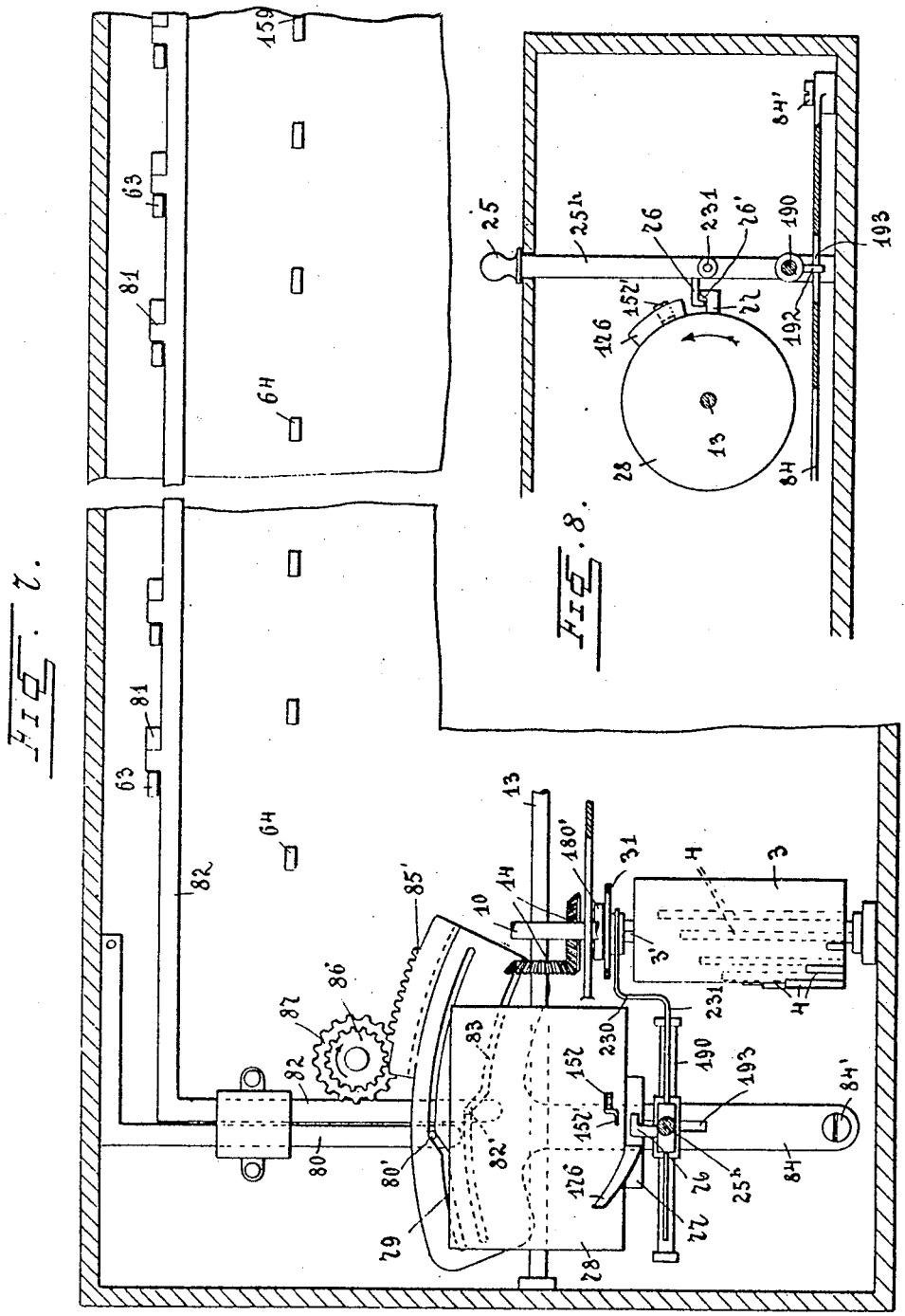
Witnesses:-
Inventor:-
Alexander Rechnitzer
by Hopkins & Lenz
Attys No. 809,075. PATENTED JAN. 2, 1906.
A. RECHNITZER.
CALCULATOR.
APPLICATION FILED JUNE 29, 1901.
6 SHEETS—SHEET 5.
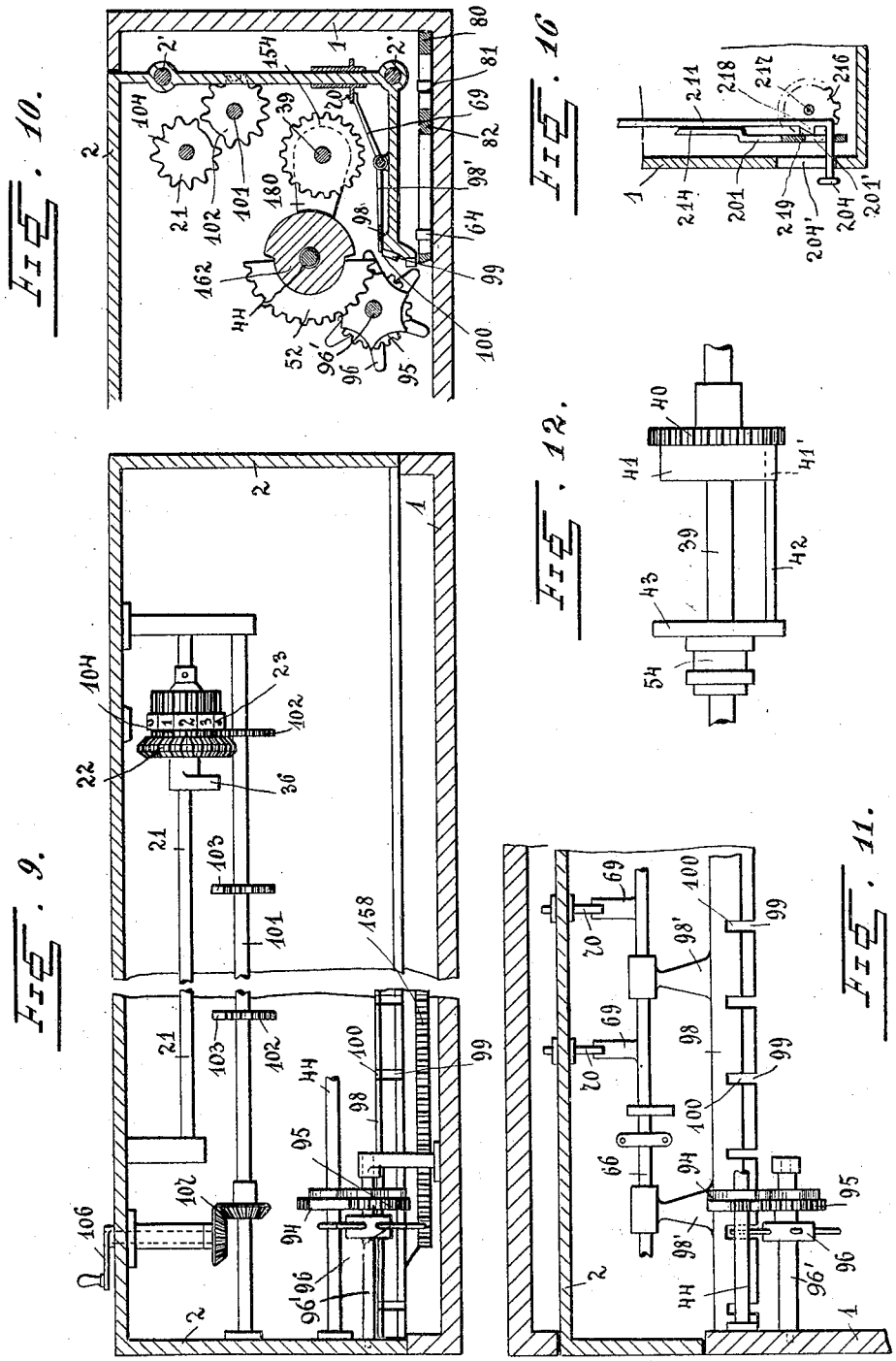
Witnesses:-
K. Munk
J. Hübers
Inventor:-
Alexander Rechnitzer
by Hopkins & Kenz
Atty's No. 809,075. PATENTED JAN. 2, 1906.
A. RECHNITZER.
CALCULATOR.
APPLICATION FILED JUNE 29, 1901.
8 SHEETS—SHEET 6.
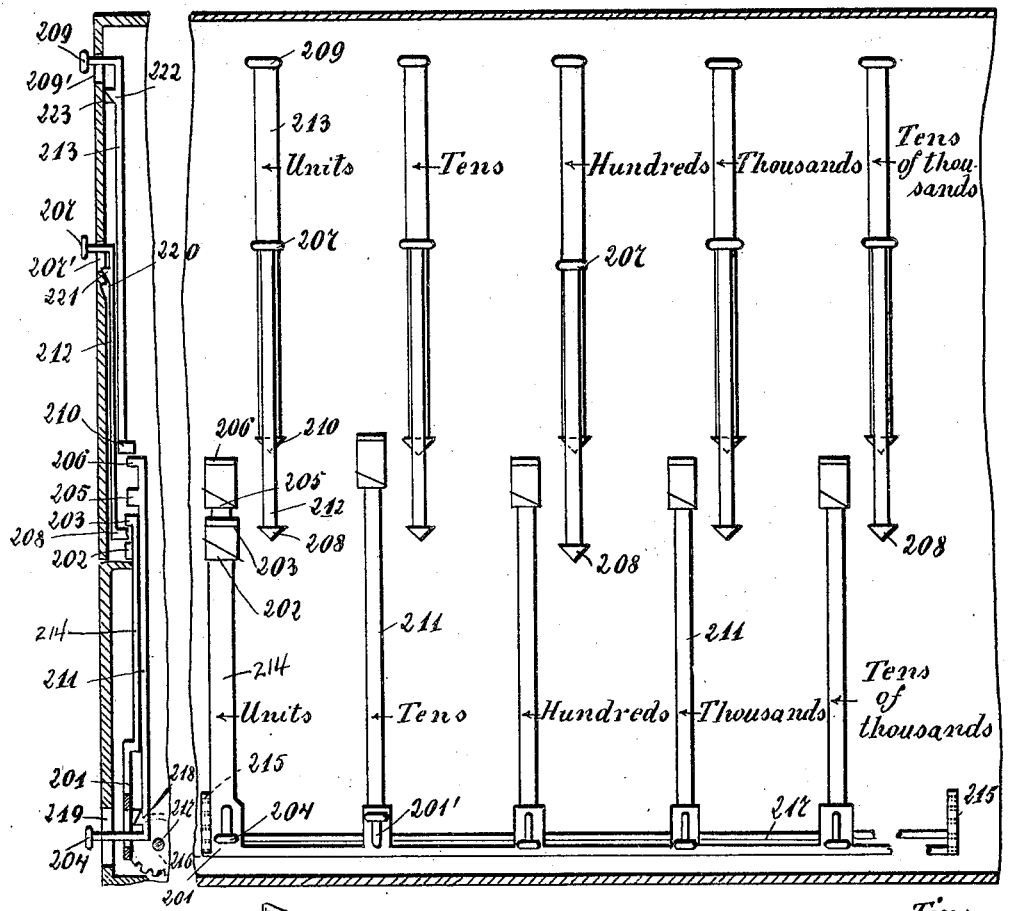
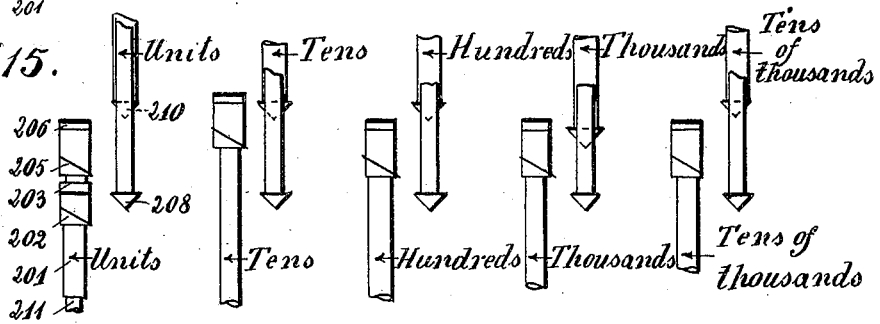
Witnesses:—
Inventor:—
Alexander Rechnitzer
by Eustace W. Hopkins
Atty.

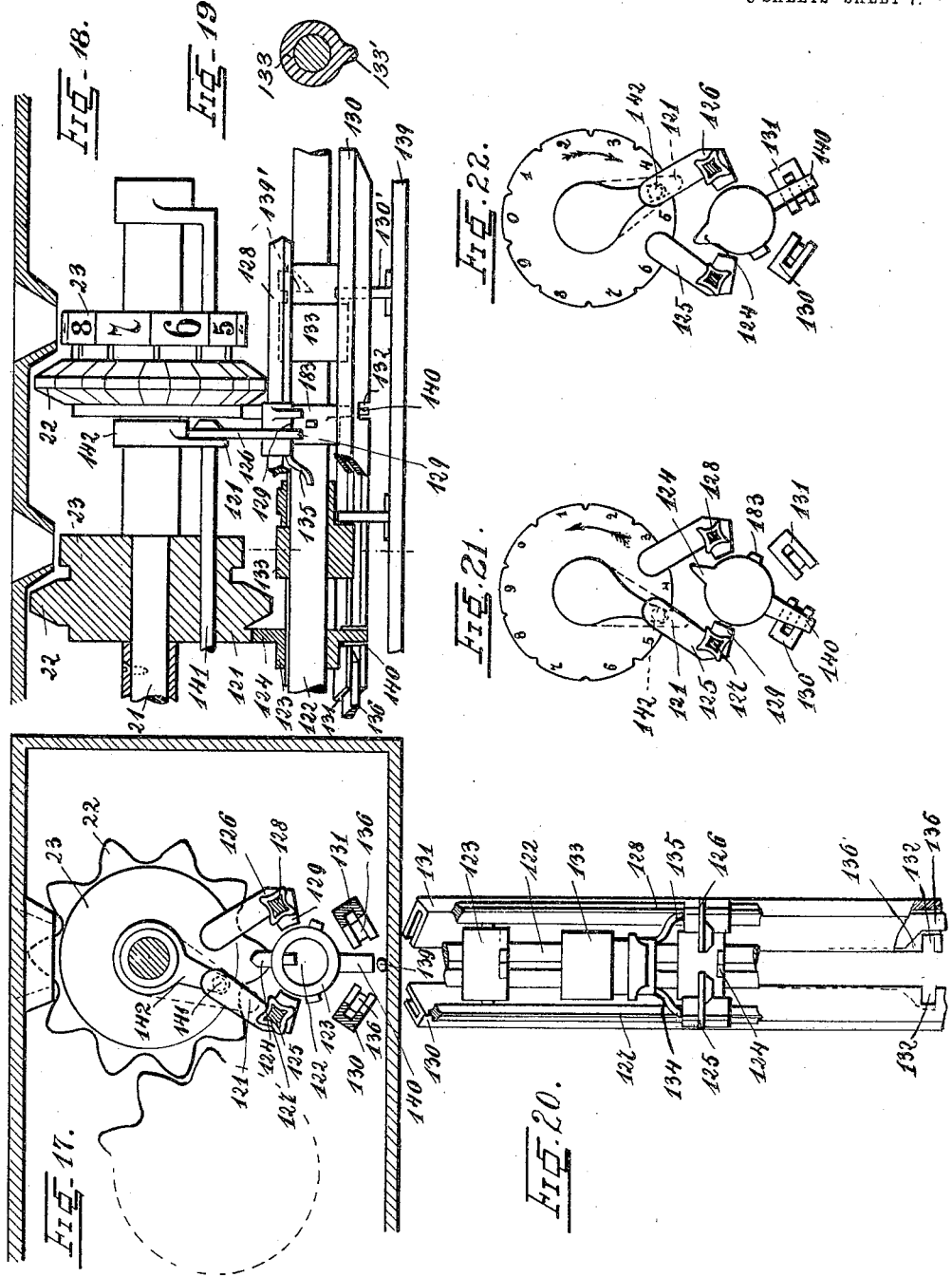

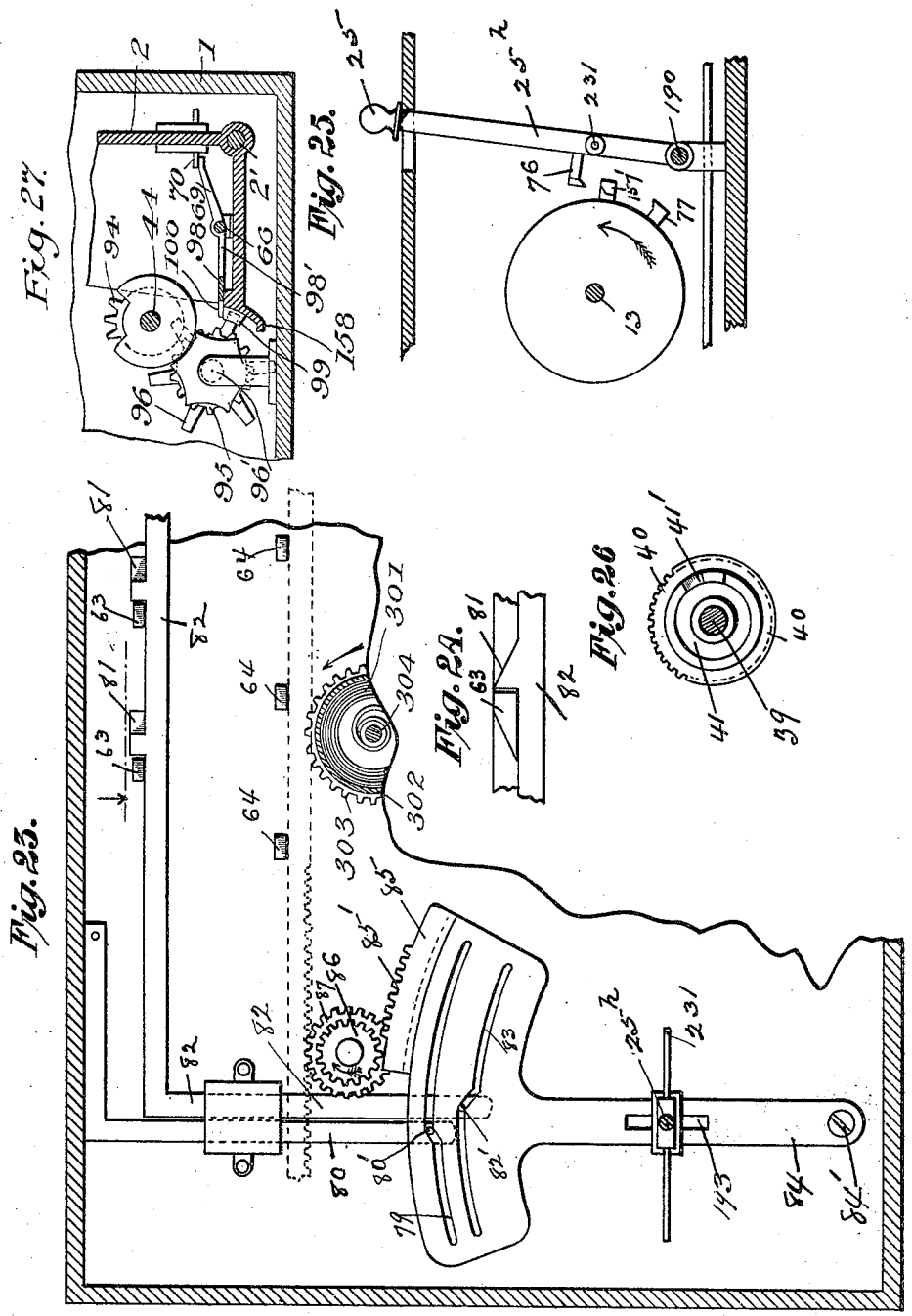

UNITED STATES PATENT OFFICE.

ALEXANDER RECHNITZER, OF VIENNA, AUSTRIA-HUNGARY, ASSIGNOR TO THE KEUFFEL & ESSER COMPANY, OF HOBOKEN, NEW JERSEY, A CORPORATION OF NEW JERSEY.

CALCULATOR.

No. 809,015.      Specification of Letters Patent.      Patented Jan. 2, 1906.

Application filed June 29, 1901. Serial No. 66,595.

*To all whom it may concern:*

Be it known that I, ALEXANDER RECHNITZER, a subject of the Emperor of Austria-Hungary, residing at Vienna, Empire of Austria-Hungary, have invented certain new and useful Improvements in Calculators, of which the following is a full, clear, and exact description.

The present invention relates to calculators or calculating-machines adapted to register or record numbers or figures and to perform automatically either addition, subtraction, multiplication, or division.

I will now describe an apparatus embodying the preferred form of my invention, which apparatus is illustrated in the accompanying drawings. I will then point out the novel features of my invention in claims.

Figure 1 shows part of a calculator embodying the preferred form of my invention partly in plan view and partly with the top of the casing and carriage removed. Fig. 2 is a vertical longitudinal section on the line A B of Fig. 1. Fig. 3 is a sectional view. Fig. 4 is a cross-section on the line C C of Fig. 1. Fig. 5 is a detailed section through a part of the housing and carriage. Fig. 6 is a perspective view of the exterior of the housing and carriage; Fig. 7, a plan view of the interior bottom of the housing, showing a lever mechanism for operating the machine. Fig. 8 is a sectional elevation of the operating-lever; Fig. 9, a longitudinal section showing the carriage-controlling mechanism; Fig. 10, a cross-section showing a further detail of said mechanism; Fig. 11, a partly-sectional plan of Fig. 9. Fig. 12 is a plan of a mechanism employed in connection with the transferring or carrying of units, tens, &c. Figs. 13 to 16, inclusive, show a device for automatically placing decimal-points, Fig. 13 being a cross-section, and Fig. 14 a plan, of the parts in position for multiplying, and Fig. 15 a partial plan view of parts arranged for carrying out division, and Fig. 16 a cross-section embodying in detail means for setting decimal-points in the row $c$. Fig. 17 is a section and elevation of a modified form of device for operating tens and hundreds numeral-disks. Fig. 18 is a sectional front elevation of Fig. 17. Fig. 19 is a cross-section on the line A B of Fig. 18; Fig. 20, a sectional plan of the lower part of Fig. 17, and Figs. 21 and 22 are diagrams showing the operation of the device illustrated in Figs. 17 to 20. Fig. 23 is a detail view of the lever 84 with its segment and rack thereon and other devices for changing the position of the carriage. Fig. 24 is a detail of the inclines 81 on the bar 82. Fig. 25 is a detail of the operating-lever $25^h$, the operating-drum 78, and the coacting parts provided thereon. Fig. 26 is a detail view of the cam arrangement on the face of the collar 41 of the cog 40. Fig. 27 is a detail view of the carriage-controlling mechanism.

The operation of the apparatus shown in the accompanying drawings embodies the principle of reducing multiplication to a series of additions and division to a series of subtractions. In other words, to multiply six by three is, when reduced, the same as adding three sixes together or adding six to zero three times, and vice versa, as to division.

Later on I will describe the specific construction and operation of various parts and suggest some modifications thereof. At present I shall merely describe the machine shown in the accompanying drawings in a general way and point out the operation thereof without going into details.

The calculator shown in the accompanying drawings generally may be said to comprise two principal parts, one movable and the other immovable. The first or movable part I shall hereinafter call the "carriage." The second or immovable part I shall hereinafter refer to as the "casing." The casing may be said to contain the operating mechanism or operating devices, whereas the carriage contains what may be called the "registering" or "counting" mechanism, which comprises, first, the registering devices proper or numeral-disks 23, and, second, mechanism or mechanisms for causing said registering devices, considered as a series, to act in harmony each with the others, and especially in transferring the tens, by which I mean "carrying" or "borrowing" units, tens, or hundreds, &c., in addition and subtraction, respectively.

The carriage 2 is movable with regard to the casing 1 and in a longitudinal direction. This movement is created and automatically controlled, as I will point out more in detail hereinafter. The numeral-disks 23 or registering devices proper are in a certain sense at least the most important parts in this carriage 2. They should be so mounted as to be capable of being rotated in either direction and are shown as all being mounted on a common shaft 21. Each has rigidly attached thereto a numeral-disk cog 22, adapted to turn and be turned therewith. This cog 22 is so arranged as to be engaged with and operated by suitable devices, such as the disk-operating cogs 18 and 19, mounted in the immovable casing 1. In other words, operating mechanism, such as that in the immovable casing 1, will directly engage with and independently rotate each of the various numeral-disk cogs 22 and the numeral-disks 23 in a direction from "0" to "9" for addition and multiplication and in a direction from "9" to "0" for subtraction and division. I will explain my preferred form of operating mechanism hereinafter, which, as will be seen, automatically rotates each numeral-disk 23 to a varying but predetermined extent and each independently of the others. It is quite evident that when a given numeral-disk 23 passes from "9" to "0" or from "0" to "9" in addition or subtraction, respectively, then it is necessary to carry or transfer a unit or ten or hundred, as the case may be, to the numeral-disk to the immediate left of the disk in question. This operation, which I shall hereinafter call "the transferring of the tens," is carried out by other devices shown as mounted in the carriage 2. It should be noticed that these devices are not mere operating devices in the sense that they operate any one numeral-disk independently of the others, but that they rather comprise a mechanism for causing the numeral-disks, considered as a series, to act in harmony each with the others, and specifically for causing each numeral-disk as it passes from "9" to "0" in either direction automatically to cause the disk to the left thereof to register the ten which must be transferred.

Each numeral-disk 23 carries a single tooth 36, Figs. 1, 3, rigidly secured to and rotating with the same, and as each numeral-disk 23 passes from "9" to "0" in either direction the tooth 36 comes into engagement with one of the cogs 38, Figs. 3, 4, all of which are loosely mounted on a shaft 37, and turns the same to a certain extent. Each of these cogs 38 engages with a cog 40, loosely mounted on another shaft 39. Each of these cogs 40 has a preferably cylindrical collar 41 integral therewith or rigidly secured thereto, Figs. 3 and 26, and each of said collars has a cam depression 41' in its edge. In each of these depressions is arranged the tapered end of a pin 42, Figs. 3, 4, which pin is in turn mounted in the adjacent face of a disk 43, having a single tooth 43' formed thereon. These disks 43 are keyed to the shaft 39 and capable of longitudinal movement on their keys and also rotate with said shaft. Consequently when the loosely-mounted cog 40 is turned by the movement of the cog 38, actuated by the single numeral-disk tooth 36, turning the same, the tapered end of the pin 42 will be forced out of the cam-recess 41' of the said cog-collar 41, and the disk 43, with its cog-tooth 43', will thus be slipped along the shaft 39 to the left, Fig. 3, and will thus be brought nearly, but not quite, into engagement with a cog 50, arranged on the shaft 37. The shafts 37 and 39 may be supported in any suitable manner. The shaft 37 will, however, be supported so that the same will be movable longitudinally in its bearings for reasons hereinafter set forth. Its supports may be mounted on and extend from any wall of the carriage, (in the drawings are shown the left support 37', mounted on the rear, the right support 21' on the top plate of the carriage,) or the free end of the shaft may itself extend through and be movably mounted in the end wall of said carriage. The shaft 39 may be similarly supported, but not being capable of a longitudinal movement. The cogs 50 are each loosely mounted on the shaft 37 and have rigidly connected thereto additional cogs 51. The cogs 50 are each always in engagement with one of the cogs 35, rigidly secured to the numeral-disks 23.

It is evident from the above that as each numeral-disk passes from "9" to "0" the corresponding disk 43 is moved to the left and arranged so that its single tooth 43' will when revolved, almost but not quite, engage with its cog 50, and it is also evident that if this single tooth 43' did engage with a cog 50 it would turn said cog one tooth and necessarily, therefore, turn the corresponding numeral-disk one number and of course in a direction dependent upon the direction in which the tooth 43' and the disk 43 are rotated.

The shaft 37 is longitudinally movable in its bearings, and when it moves in a longitudinal direction carries with it the cogs 50. This shaft 37 is also provided with an arm 49, engaging with a cam-groove 48 on a drum 48', loosely mounted on the shaft 39. Upon the rotation of this drum 48' the shaft 37 is drawn toward the right, Fig. 3, and the cogs 50 brought into a position to be engaged by the tooth 43' of each and every disk 43 which has been moved to the left by its numeral-disk passing from "9" to "0," as above described.

As I prefer to carry or transfer all my tens simultaneously, I have so arranged matters in the machine herein illustrated that all movement of the numeral-disk 23 caused by the operating mechanism arranged in the casing 1 or, in other words, all direct movement of each numeral-disk, is completed during the first half of the rotation of the main or power shaft 13 of the apparatus and that no movement either of the shaft 39 or of the drum 48 takes place during the first half of the rotation of the shaft 13, but solely during the second half of its rotation. As a result at the end of the first half of each rotation of the shaft 13 all the disks 43 whose numeral-disks 23 have during this rotation passed from "9" to "0" will have been moved to the left and will be ready to engage the corresponding cogs 50 so soon as the same are moved to the right, and as upon the rotation of the drum containing the cam-groove 48 the shaft 37 and all the cogs 50 are simultaneously moved to the right then upon the rotation of the shaft 39 in either direction all the numeral-disks 23 to the immediate left of each numeral-disk which has passed from "9" to "0" will be simultaneously rotated one number in a direction corresponding to the direction of rotation of the shaft 39. The question now comes, supposing two or more numeral-disks are at the figure "9" in addition or multiplication or at the figure "0" in subtraction or division, as to how the tens are to be carried. In other words, supposing you have "999" and desire to add one or more thereto, it is evident that each of these three numeral-disks will have to be moved to "0" and, further, that the fourth numeral-disk to the left of the same will have to be moved to "1." I have already stated that the cogs 50 are rigidly connected with their cogs 51 and all loosely mounted on the shaft 37. Consequently so soon as the shaft 37 is moved to the right by the engagement of its arms 49 with the cam-groove 48 not only the cogs 50, but also the cogs 51, will be moved to the right and, as will be seen from Fig. 3, will be moved to such a position as to be engaged by the single tooth 36 of each and every numeral-disk 23 which passes from "9" to "0" or "0" to "9." Therefore whenever a given numeral-disk is moved between "9" and "0" by its cog 50 its tooth 36 will rotate the cog 51, which is rigidly connected to another cog 50 to the left, and will consequently rotate the numeral-disk 23, which is immediately to the left, one figure and in the same direction as the first-mentioned numeral-disk rotated. Furthermore, this movement will clearly take place simultaneously with the other transfers of the tens.

The drum containing the cam-groove 48 is provided with two cogs 160 and 161, respectively, either one of which, depending upon the position of the carriage 2 with relation to the casing 1, will during the second half of the revolution of the shaft 13 always be engaged and rotated by one of the segments 52, arranged on a cylinder 162, mounted on a shaft 44, arranged in the immovable casing 1 and driven in any suitable way, as by a motor 11. The number of the segments 52 will of course depend upon the size of the machine and, as will hereinafter more fully appear, upon the number of steps or extent of movement of the carriage with relation to the casing. The only requisite is that no matter what the position of the carriage with relation to the casing one of the cogs 160 or 161 and also one of the gears 154 or 153 should always be in a position adapted to be engaged by one segment 52 upon rotation of the same.

Mounted on the shaft 39 are change-gears comprising two cogs 153 154, each provided on its inner face with a bevel-gear 151 and 150, respectively, in engagement with a common bevel-gear 152. Of course one of these cogs 153 154 is rigidly secured to the shaft 39 and the other loosely mounted thereon. One of the segments 52 during the second half of the rotation of the shaft 13 will always be in engagement with one of the cogs 153 or 154 and will consequently rotate the shaft 39, together with its disks 43, in one direction or the other, depending upon which of said cogs 153 and 154 said segment 52 engages. This is in turn dependent upon the position of the carriage 2 with regard to the casing 1, which position is, as hereinafter explained, automatically regulated, depending upon whether the operation to be performed is addition or multiplication on the one hand or subtraction or division on the other. Evidently half a rotation of the drum and cam-groove 48 will move the shaft 37 to the right, and this shaft will be returned to its normal position after the transfer or carrying of the tens and during the second half of the rotation of the drum. Cut in the face of the same drum is another cam-groove 58, which is engaged with the end of a shaft 57, provided with a series of fingers 56, each adapted to engage with and return to its normal position each of the disks 43 which have been shifted.

In order to arrest all the numeral-disks 23 in their proper positions after they have been rotated, a sliding bar 59 is provided having its end 61 in engagement with the cam-groove 62 of the drum, which is rotated with the cam-drum 48 by the segment 52 of the roll 162. This bar carries a series of stops 60, adapted when the bar is moved to the left, Fig. 3, to simultaneously engage in the teeth of all the cogs 22 of the numeral-disks 23 and prevent them from turning slightly farther, due to the impetus resulting from each movement thereof, and also to compensate for any loss of movement resulting from the slight play of the parts which is often unavoidable, even in the most carefully-executed mechanisms. This arresting and adjusting device comes into operation immediately after the numeral-disks have been operated by the device contained in the casing 1, as to be hereinafter described, and immediately after the first half of the revolution of the shaft 13. The bar 59 then continues to move to the left, so that the teeth 60, Fig. 4, pass out of engagement with their respective gears and to the left side of the same. The bar remains in this position until the tens have been transferred and is then again drawn back so that the teeth 60 again come in engagement with their respective gears. The result is that the said teeth arrest and adjust the wheels at each stroke—in other words, first, after the movement caused during the first half of the revolution of the shaft 13 and, second, after the movement caused by the transfer of the tens, as during the transfer of the tens the numeral-disks are directly connected together, so that in certain cases previously shown a movement of one of the right-hand numeral-disks would have to be transferred to the first left-hand disk 23 by means of several catches 36 and gears 51 50 35. I was compelled to provide means by which the fault resulting from the play in every mechanism may be avoided. My preferred form of this device is as follows: The stops 60 are of different lengths, the longest being at the first right-hand numeral-disk 23 and the shortest at the first left-hand disk and the intermediate teeth being made gradually shorter toward the left. This arrangement has the effect that the extreme right-hand disk will be arrested first in moving the bar 59 and every left-hand disk a little later, as a result of which any fault in consequence of the play of the mechanism is avoided. Of course any means adjusting the disks one after the other—for instance, excenter pressing-springs against the disks—will be satisfactory for the purpose mentioned. This device is a distinct invention itself, and I do not limit the use of it to calculating-machines.

I will now return to the numeral-disks 23 and the ordinary operation of the same by the operating mechanism contained in the casing 1. As I have already pointed out, each of these numeral-disks 23 is loosely mounted on a common shaft and has rigidly secured thereto a numeral-disk cog 22. Evidently any operating mechanism which automatically will simultaneously rotate each of these numeral-disks to a predetermined and separate extent in one direction will be satisfactory for addition. It is also evident that if the numeral-disks are rotated in the opposite direction in the same manner the operation of subtraction can be carried out. My preferred construction for operating these numeral-disks, however, is as follows: Cogs 18 and 19 are arranged so as to engage with any numeral-disk cog 22 which may be in alinement or in the same transverse plane therewith. Each of these cogs 18 and 19 has rigidly connected to it and adapted to turn therewith a bevel-gear, (marked, respectively, 16 and 17,) both of which bevels are in each case simultaneously engaged with a bevel-gear 15, mounted on the inner end of a shaft or spindle 10. This shaft is supported in the casing in any suitable manner and so as to be rotated in the desired direction, as from right to left, as is more fully hereinafter explained. It is evident that as each spindle 10 turns toward the left the bevel 15, rigidly secured thereto, will necessarily turn in the same direction, and thus cause the connected bevel 16 and its rigidly-connected cog 18 to rotate in one direction, as toward the front of the machine, and the bevel 17 and its rigidly-connected cog 18 to turn in the other direction, say toward the back of the machine. Evidently whenever the numeral-disks 23 have their cogs 22 in engagement with the cogs 18 they will be turned in one direction—say toward the back of the machine, or from "0" toward "9"—whereas whenever their cogs 22 are in engagement with the cogs 19 they will be rotated in the opposite direction—say toward the front of the machine, or from "9" toward "0." It is also evident that the greater distance any one of the given cogs 18 or 19 rotates the farther it will cause the numeral-disk cog 22 in engagement therewith to rotate. Preferably the cogs 22, 18, and 19 will be so constructed and arranged with relation to numeral-disk 23 that one complete rotation of the cogs 18 and 19 will cause a complete rotation of any of the numeral-disks 23 in engagement with either of said cogs 18 or 19 and a complete rotation in a direction dependent upon which of said cogs 18 or 19 the said numeral-disk cog 22 is in engagement. A convenient arrangement, for example, would be to have each numeral-disk 22 provided with twenty teeth and each of the cogs 18 and 19 also provided with twenty teeth and then have the ten numbers from "0" to "9," inclusive, on the numeral-disk spaced evenly around the circumference of same or so that a revolution of two teeth of the cogs 18 and 19 and 22 would cause a revolution of one of the numbers on each of the corresponding numeral-disks.

It is evident from the above that the question as to how far and in which direction a given numeral-disk will rotate, or, in other words, how many numbers will be changed on each said disk, is dependent, primarily, upon two factors—first, whether its numeral-disk cog 22 is engaged with one of the cogs 18 and one of the cogs 19 which determines direction, and, second, how far the cogs 18 and 19 will be rotated. The question of the distance or extent of the rotation of cogs 18 and 19 in their respective directions is evidently solely dependent upon one factor—to wit, the extent to which shaft 10 and its connected bevel 15 is rotated. Preferably this shaft 10, bevel-gear 15, and the bevel 16 will be so constructed and arranged that one complete rotation of shaft 10 will cause a complete rotation of the gears 18 and 19. Evidently, therefore, in order to cause the respective numeral-disks 23 to rotate any given number of figures in either direction, as from "0" to "9" or "9" to "0," all that is necessary is, first, to secure the engagement of the numeral-disk cogs 22 each with one of the cogs 18 or one of the cogs 19 to determine direction, and, second, to regulate the extent of rotation of cogs 18 and 19 or in the construction shown the extent of the rotation of the common bevel-shaft 10.

For reasons which are more fully explained hereinafter I shall never desire any numeral-disks to be moving simultaneously in different directions. Therefore I shall always have all of the numeral-disk cogs 22 in engagement either with cogs 18 or with cogs 19. Consequently it will only be necessary during the operation of mechanism to hold the movable carriage in only one of two general positions with relation to the fixed casing 1. In the first of these positions the cogs 22 of all numeral-disks 23 to be operated will each be in engagement with one of the operating-cogs 18. In the second position each of said numeral-disk cogs will be in engagement with one of the oppositely-moving cogs 19. A means for holding these parts in this position will be hereinafter set forth. I do desire, however, automatically and simultaneously to rotate my numeral-disks in the same direction to a varying extent. In other words, I may desire one of these not to move at all, others to move two numbers, others to move five numbers, and so on. In order to accomplish the result, it is evident that I need only have each of the shafts 10 separately controlled and so as to be independently and automatically rotated to a predetermined extent. This may be accomplished in a variety of ways; but my preferred method, which is illustrated in the accompanying drawings, is as follows; Arranged on the outer or front portion of each of these shafts 10 and mounted thereon so as to be incapable of any rotary movement independent of said shaft 10 is a gear 9, provided with a suitable number, such as ten, of evenly-spaced teeth $9^a$. Evidently each time any one of these gears 9 and its shaft 10 is rotated to the extent of one tooth $9^a$ the cogs 18 and 19 will each be rotated to the extent of two teeth and the numeral-disk cog in engagement therewith to the same extent of two teeth and the numeral-disk cog itself to the extent of one number. Consequently it is necessary to secure some arrangement by which the various cogs 9 will be independently and automatically rotated each to a predetermined extent. This I accomplish, as shown, first by having each of the cogs 9 longitudinally movable along its shaft 10 and arranged over a drum 3, which drum is provided around one-half of its circumference with a suitable number, such as nine, of teeth 4 evenly spaced. These teeth 4 are of different lengths, or, in other words, extend varying distances longitudinally of the drum 3. They are, furthermore, so arranged that as the drum is rotated in any suitable manner each tooth 4 thereon which extends beneath the cog 9 engages with one of the teeth $9^a$ on said cogs, and consequently rotates said cog 9 and its shaft $9^a$ to the extent of one tooth.

Evidently, therefore, if the cog 9 is in such a position that it is over a longitudinal portion of the drum 3, which is at that point provided with two teeth 4, the cog 9 will be rotated to the extent of two teeth and the corresponding numeral-disk to the extent of two numbers. In other words, the exact position of any given cog 9 will positively and accurately determine how far it and its teeth $9^a$ will be rotated, or, in other words, with how many of its teeth $9^a$ will be engaged the teeth 4 on the drum 3. I have arranged, as shown, over each cog 9 a slot 5 in the cover of the casing 1, through each of which slots passes and slides a button 7, with a downward-projecting shank 6, which fits in a circumferential groove in a collar 8, attached to each cog 9. Evidently by moving these buttons 7 upward and downward the slots 5 the position of each cog 9 may be accurately determined. Preferably each slot will be provided with a series of independent characters from "0" to "9," each of which will indicate at once how many of the teeth $9^a$ of cog 9 will be engaged by teeth 4 on the disk 3, and consequently how many numbers the numeral-disks in engagement with the corresponding cogs 18 and 19 will be rotated. The drums 3 may be rotated in any suitable manner, but preferably as shown, where each is mounted on an independent shaft 3', on the inner end of which is rigidly mounted a bevel gear-wheel, each of which gear-wheels is in turn driven by one of a series of bevels 14, each in engagement with one thereof, all mounted on a common shaft 13. This shaft may be connected in any suitable way with and driven by any suitable motor, such as that marked 11. The motor 11 shown is an ordinary spring-motor under constant tension and controlled by the controlling-lever $25^h$, provided with a knob 25 and engaging with a drum 78, rigidly secured to the motor-shaft 13, on which the bevels 14 are all also mounted. Evidently any arrangement by which each of the cylinders 3 will be simultaneously rotated one full rotation and then automatically stopped will suffice for the above-described simple operations of the numeral-disks. The specific means shown consist of the controlling-drum 78, mounted on the shaft 13, provided with a stop 77, which when the machine is at rest and to hold the same at rest engages with a hook-shaped lug 76, having a cam-surface 76' and arranged on the control-lever $25^h$. The drum 78 is also provided with a cam-hook 157, having a cam-surface 157'. So soon, Figs. 2, 7, 8, 23, and 25, as the control-lever $25^h$ is drawn back, so that the cam-lug 76 is withdrawn from its engagement with the stop 77 on the control-drum 78, said drum is released and rotated by the motor 11. As said drum revolves, and preferably as it has nearly completed one revolution, the cam-hook 157 thereon engages the lug 76, and as a result of the cam-shaped surfaces 157' and 76' of said cam-hook 157 and said lug 76, respectively, pulls the lever 25ʰ back to its original position and so that the lug 76 again engages with the stop 77 on the drum 78, and this brings the drum and machine to rest at the end of one full rotation of said drum. Of course one complete rotation of this control-drum 78 causes one full rotation of the shaft 13, the bevels 14, all the shafts 3', and all the cylinders 3.

I will now explain the operation of these parts in the simple processes of registration and addition of figures. To register a given number is evidently nothing more than to add it to zero. We will assume, therefore, that each numeral-disk 23 is set to zero. As something is to be added, the numeral-disks must evidently rotate in a direction from "0" to "9" and must therefore be in engagement with the operating-cogs 18, and not the cogs 19. Later I will explain how in my preferred form the various desired positions of the carriage 2 and its disks 23 are secured and maintained. At present I will assume that the carriage is suitably placed and held so that all the disk-cogs 22 engage with operating-cogs 18. Now let us assume that the user desires to register the number "504." The numeral-disks all being at "0" he turns to the index-numbers in the rows C and moves the first three buttons 7 in the slots 5 to figures "5," "0," and "4," respectively. He then draws back the lever 25ʰ, thus releasing the drum 78, which is automatically rotated one rotation and stopped, thus causing one complete revolution of each of the cylinders 3 with the nine teeth 4 of varying length. As the first button 7 is at "5," its spindle 10 will be engaged and rotated by five of the teeth 4 on the cylinder 3 below the same. Consequently the numeral-disk 23, whose cog 22 is in engagement with the operating-cog 18, connected to this spindle, will be rotated five numbers, or to "5." As the second button 7 is at "0," its spindle will not be moved at all, as its cog 9 will not be engaged by any of the teeth 4 on the cylinder 3 below. Consequently this numeral-disk will stay at "0." For the same reasons the third numeral-disk will be moved to "4." In short, we have a simultaneous but independent movement of two of the numeral-disks 23, which result in the registration of the number "504." In addition the above is always the first step. The operator registers his first figure (or adds it to zero) then resets the buttons 7 to correspond with his second figure to be added and again releases the lever 25ʰ to cause another automatic single full rotation of the drum 78 and each of the cylinders 3, and so on. Evidently each numeral-disk will be rotated each time the same number of units to which its corresponding button 7 is set. I have already described how when any given numeral-disk passes from "9" to "0" the disk to the immediate left thereof is during the second half of the rotation of the shaft 13 moved one additional figure, so as to carry or transfer the ten. It is evident from the above description of the drums 3 that since their teeth 4 extend only half way around the circumference of each of them the movement of the numeral-disks by said drums will be completed during and cease at the end of the first half of the rotation of the shaft 13, and thus will make it possible for the mechanism already described as contained in the carriage 2 and adapted to carry or transfer the tens and also to adjust and retain in proper position the numeral-disks to operate during the second half of the rotation of said shaft 13 and unimpeded by and without conflicting with the operation of the drums 3. When it is desired to subtract instead of to add, it is evidently only necessary to move the carriage 2 a short distance to the right, Figs. 1 and 3, or so that the numeral-disk cog 22 will come in engagement with the cogs 19 instead of the cogs 18 and, further, so that the segment 52 on the cylinder 162 will engage with the cog 154, so as to reverse the shaft 39. This carriage may be moved to and held in this position for subtraction in any suitable manner, but preferably in the following manner, which is illustrated in the drawings: Briefly, by moving the lever 25ʰ, Figs. 7, 8, 23, 25, along the longitudinal slot 25 until it is opposite the point marked "Subtraction" and then drawing said lever back the control-drum 78 is released in that the hook-shaped lug 76 on the lever 25ʰ is withdrawn from its engagement with the stop 77 on the drum 78. This same longitudinal movement of the lever 25ʰ swings another lever 84, fulcrumed at 84', Figs. 1, 2, 7, and 23. Thus is swung also the segment 85, provided with rack-teeth 85', which mesh with the gear 86, which in turn rotates a gear 87, which engages with a rack 158, rigidly secured to the front of the carriage 2. This rotation of the gear 87 in engagement with the rack 158 forces the whole carriage backward or to the right, Figs. 1, 3, and 23. The carriage may be arrested in this position by means of the following mechanism: Referring to Figs. 3, 5, 7, at the bottom of the casing two rows of stops 63 and 64 are provided, the members of each row being staggered as regards each other, so that a yoke 65, mounted fast on a shaft 66, Fig. 5, when tipped will engage first one member of one row and then on being tipped in the opposite direction will engage the next member of the next row, and thus allow the carriage 2 to go stepwise along under the influence of the coil-spring 301, Fig 23. This spring 301 is inclosed in a casing 302, which is pivoted with its axis 304 on the bottom of the casing 1, Fig. 23, the cog 303 of which meshes with the rack 158 of the carriage, this carriage thus being always pulled to the left. Now in connection with the row of stops 63 a bar 82 is employed carrying a series of inclines 81, Fig. 7, and when this bar is in the position shown in Fig. 7 the row of stops 63 will be ineffective—i. e., they will not act—since the corresponding arm of the yoke 65 will slide up the inclines 81, Figs. 7, 23, 24, and simply tip the yoke barely so that in this position of the bar 82 in the row of stops 64 will be effective. In performing the subtraction calcu which has, as necessary that the carriage 2, with the right by already described, been forced, be arrested as the movement of the lever 3, which is provided behind the endmost stop consequently it is necessary for this purpose, and the inclines 81 from the essary to remove is effected by means of the stops 63. This the pin 82¹ at the end of the an-lever 25ʰ and bar 82. This pin engages a cam-gle-arm of the segment 85, and when the lever slot 83 of moved to "Subtraction" the cam-slot of 25ʰ is segment 85 pulls the bar 82 toward the the s of stops 64, and thus out of engagement row h the stops 63. An inclined surface at with end of the row of stops 64 and indicated the 159 serves to tip the yoke 65 over, so as to by use its opposite end to engage behind the ca ast stop 63 when the carriage on which the l yoke 65 is mounted has been forced to the right for the subtraction operation. When the bar 82 is pushed back for other calculations, the last inclined surface 81 (at the right in Fig. 7) of the same will automatically disengage the yoke 65 from the stop 63 and the carriage will return to its normal position—i. e., the first right adding position, in which the carriage is stopped by the last right-hand stop 64. This movement of the carriage to the right causes the shifting of the segments 52 out of that position in which they are adapted to be engaged by the gears 153 and 161 to the position where they will be adapted to be engaged with the gears 154 and 160, and similarly the cogs 22 are thereby caused to gear with the cogs 19, so that the disks will be turned in the opposite direction—i. e., from "9" to "0". At the same time, however, the stop or hook 76 will be disengaged from the stop 77 by the lateral movement of lever 25 and the drum 78 will be free to turn one rotation; but it will only turn one rotation, because the cam 176 on the said drum toward the latter part of its movement, Figs. 7 and 8, throws the lever 25ʰ back to its position of rest or normal position and at the same time guides the lug or hook back over the stop 77 and arrests the drum. The numeral-disks will now have been turned in the opposite direction and will have subtracted the sum last adjusted from the original sum adjusted in the top row, and the result of the subtraction of course appears in the top row. The tens, hundreds, &c., are subtracted in the manner previously described, the only difference being that the numeral-disks are turned from "9" to "0" instead of vice versa. As to the operations of multiplication and division, as I have already stated, multiplication is nothing more than a series of additions, and division nothing more than a series of subtractions. For example, to multiply six by three is the same thing as to add three sixes together or to add three sixes in succession to zero. Consequently it is evident that all that is necessary to cause the parts already hereinbefore described to multiply automatically is to provide a mechanism by which the said devices already described will automatically and successively register on the numeral-disks 23 or, in other words, will automatically and successively add to zero on said numeral-disks a given number any predetermined number of times. Evidently the total result will appear on the numeral-disks or registering devices. The preferred form of mechanism which I have devised for this purpose is as follows: Arranged in the carriage 2 are a series of buttons 27, Figs. 1, 2, and 4, preferably mounted in slots arranged in the top of the carriage and provided with index-figures b. This top of the carriage will preferably extend, as shown in Figs. 1 and 6, over a portion of the mechanism contained in the immovable casing 1, and the slots and figures b will be arranged in this extension. Each button 27, Figs. 1, 2, and 4, is rigidly secured to the front end of a rack 28, arranged and suitably supported to slide backward and forward, and at the top or beneath the cover of the carriage 2. Each rack 28 is provided with a suitable number of teeth corresponding to the index-numbers arranged along the slot—viz., "0" to "9." Two worms 29 and 30 are suitably arranged in the casing 1, so as to be in position to engage with any rack 28 brought into position above the same. Each of these worms 29 and 30 will be so constructed as to permit of the racks being moved past or through the same when said worms are in proper position therefor. This may be accomplished by having said worms extend not quite around their shafts. These worms 29 and 30 preferably are mounted in a space between the two left-hand slots 26. They are shown as rigidly secured to the ends of independent shafts suitably mounted in the casing and at their front ends provided with gears 32', one rigidly secured to each of the same, which are in turn adapted to be engaged by the intermediate gear 32, this being rotated by the segment 31, suitably mounted to rotate with the left-hand spindle 3' of the apparatus. The segment 31 and gears 32 and 32' are so arranged with relation to each other that during each rotation of the drum-spindle 3' they will rotate the worms 29 and 30 one full rotation. The gear of segment 31 with cog 32 might be made compulsory by using the well-known device of safety-disks 180 180', Fig. 2. It is evident from the above that every rotation of the drum-shaft 3' will not only cause the worms 29 and 30 each to rotate one full rotation and in opposite directions, but also that any rack 28 in engagement with either of said worms 29 and 30 will be moved a given distance in one direction or the other, depending upon which of said worms 29 or 30 is in engagement therewith. Preferably said worms will be so constructed that one complete rotation of either of the same will cause any rack 28 in engagement therewith to be moved one number, or, in other words, to be moved to such an extent as to cause its button 27 to move one number in its slot 26. As these devices are of use only in multiplication and division and are not required in either addition or subtraction, it is preferable that some arrangement be provided to throw the same out of engagement except during multiplication and division. This may be accomplished in any suitable manner, but will preferably be accomplished as shown, so that the segment 31 will automatically be withdrawn from engagement with the intermediate gear 32 by the movement of the lever 25$^h$ when the same is drawn back to release the drum 78 in either addition or subtraction. As will be seen, Figs. 2, 4, 7, and 8, a bar or rod 231 passes through and engages with the lever 25$^h$. This rod at its right end is provided with an extension 230, having a bow which encircles the boss of the segment 31 and fits in a groove cut in said boss. The segment 31 is mounted so as to be free to slide along its spindle 3$^l$. Consequently when the lever 25$^h$ is drawn back to release the drum 78 in either addition or subtraction, or, in other words, drawn toward the front of the machine, the rod 230, together with the extension 231 and the segment 31, will also be drawn toward the front of the machine, thus pulling said segment out of engagement with the intermediate gear 32. In multiplying the multiplicand will be set up in the slots c, the same as for addition, and the multiplier will be set up in the slots b. Upon the lever 25$^h$ being moved to the point marked "Multiplication" the drum 78 will be released, since the cam-shaped hook 76 will then be drawn sidewise out of engagement with the lug 77. The lug 76 will by this same movement also be moved to a position where it cannot be engaged by the cam-hook 176, or, in other words, to such a position as to allow the drum 78 to be operated and rotated without any cessation so far as the lever 25$^h$ or devices connected thereto are concerned. Consequently the cylinder will keep on rotating and during each complete rotation will register or add the number represented by the multiplicand on the numeral-disks 23; but during each complete rotation of the main shaft 13 and the cylinder 3 the button 27 on the rack 28, arranged over the worm 29, will be moved one figure nearer zero. Evidently, therefore, by the time the button 27 has reached zero the multiplicand will have been added to the numeral-disks the number of times represented by the figure opposite which the button 27 was set. In other words, if the multiplicand was "157" and the multiplier "4," then "157" would have been added or multiplied by "4" and the result of "628" registered on the numeral-disks means so far, however, I have described no means for stopping the mechanism in multiplication at this point, nor yet any mechanism providing for two or more figures. I will now describe my preferred form of mechanism for carrying out these results, which, as will be seen, comprises an automatic step-by-step movement of the carriage with relation to the casing until a calculation is completed and registered, and then a release of the carriage and allowing it to run to the end of the casing or until brought to a stop by a buffer or any other suitable means, such as the end of the casing itself. Briefly, this step-by-step movement is accomplished by means of stops 64, which successively hold the carriage in an operative position with relation to the casing and from which successively said carriage is automatically released, together with devices adapted to engage with said stops and devices for releasing the carriage from such engagement. The carriage is held in engagement with one of said stops 64, Figs. 3, 4, 5, and 7, by means of a pawl 65, having two arms, one of which is adapted when pressed down to engage with the next stop 64. This pawl 65 is rigidly secured to and adapted to rotate with a rock-shaft 66, suitably mounted, and to which is secured an arm 69. Adapted to engage with and depress this arm 69 is arranged an upwardly-spring-pressed finger 70. This finger is in turn engaged by a nose or projection 75, rigidly secured to a sliding bar 74, which is arranged to slide in a sleeve 72, pivotally supported at the fulcrum 71. This bar 74 is normally held in an upward position by a spring 73. Whenever the said bar is pressed down against the action of the spring 73, its nose 75 will depress the finger 70, and consequently the arm 69, and thus in turn rotate the rock-shaft 66 and swing the pawl 65 down to the right, Fig. 5, and thus throw it out of engagement with the stop 64. Evidently so soon as the sliding bar 74 is released it will swing back to its normal position. The pawl 65 is turned back into position to engage with the next stop 64 by the action of one of the inclines 81, arranged on the bar 82, which inclines, as I have already pointed out, prevent the engagement of the pawl with the division-stop 63, over which it has to pass. The bar 74 is arranged in the immovable casing, whereas the finger 70, together with the arm 69 and the rocking shaft 66, are arranged in the movable carriage 2. Evidently whenever the carriage is held in position by any one of the stops 64 the nose 75 of the sliding bar 74 must be in engagement with the finger 70, and consequently it will be preferable to have a series of fingers 70 arranged each in the carriage, and each adapted to operate the rock-shaft, and each so arranged that when the carriage is held by any one of the stops 64 the said finger will be adapted to be engaged by the nose 75. It is also evident that whenever the carriage is held in operative position for multiplication by any one of the stops 64 the mere pressing down of the bar 74 will release the carriage, which will then move one step or to the next stop 64, where it will be again arrested and held by the pawl 65 engaging the next stop. In order automatically to release the carriage and allow it to move one step or to the next stop 64 in multiplication, I have provided each rack 28 at its back end, Fig. 4, with an inclined or cam surface 88, adapted, so soon as the button 27, attached to said rack 28, reaches zero, to operate against and press down the upper end of said sliding bar 74, and thus release the carriage. So soon as the carriage is released the inclined surface 88 of the rack 28 will pass out of engagement with the bar 74, which will be returned to its normal position and allow the pawl 65 to engage with the next stop 64. The same operation will then be repeated, by which I mean that the multiplicand will again be added a number of times corresponding with the number indicated by the position of the next button 27, and when this button 27 reaches zero the carriage will again be released, and so on until all the remaining buttons 27 are at zero, or, in other words, until all the figures in the multiplier have performed their operation. Then the remaining buttons 27 all being at zero and the inclined ends 88 of the racks all being adapted to engage with the upper end of the sliding bar 74 the said bar would evidently be successively depressed, and the carriage will be allowed to run to its limit of movement, when it will be brought to a stop, as already hereinbefore described, by a buffer or the end of the casing or in any other suitable manner. As I want to find the quotient automatically, I am compelled to provide means which compare automatically two quantities set up on a machine (in the present case figures, a dividend and a divisor) and indicate automatically the proportion of the two quantities—i. e., the quotient. I accomplish this result by means which deduct the one quantity (the divisor) successively from the other (the dividend) and by further means adapted to reverse the action of deducting when the right number of subtractions is overpassed and adapted then to correct the fault occurred. My preferred form of such a device is described hereinafter. The operation of division, as has previously been stated, is nothing more than a series of subtractions.

To perform it with the machine shown in the accompanying drawings, the dividend is set up or registered on the numeral-disks 23 and the divisor set up on the slots $c$. The numeral-disks being free to turn, the dividend may be set up by turning them by means of the finger or any suitable instrument applied through the orifices 24. The lever $25^h$ is then pushed to the point marked "Division" and at once causes the carriage to move to the right precisely as in subtraction and also permanently releases the drum 78 by drawing the hook 76 out of engagement with the stop 77. This movement of the carriage to the right causes the end of the pawl which has been in engagement with the stops 64 to become engaged by an inclined surface 159, Fig. 7, and then thrown over so that the said pawl will immediately engage the subtraction-stop 63, the inclines or wedges having been automatically removed by means of the lever $25^h$, as in subtraction. Evidently each rotation of the main driving-shaft 13 will subtract the divisor once from the figures of the dividend arranged over the divisor. Evidently also after each such rotation and subtraction the corresponding button 27 will be moved down one number in its slot 26, as its rack 28 will now be engaged by the worm 30, the carriage being in the subtraction position. Evidently, also, if the machine continues to subtract it will attempt to subtract the divisor once too often, and this in turn will cause the extreme left-hand numeral-disk 23 to pass from "0" to "9," or, in other words, to attempt to "borrow" an extra ten. I have devised an arrangement by which so soon as this left-hand numeral-disk passes from "0" to "9" it will release the carriage 2 by throwing the pawl 65 out of engagement with the stop 63. Evidently, however, the machine has subtracted once too often, and consequently the button 27 has been moved one figure too far, and therefore in order to remedy this error it is essential in the precise construction shown that when the carriage is released the button 27 should be moved back one number. I accomplish this, as explained more in detail hereinafter, by releasing the carriage 2 from the stop 63 as the left-hand numeral-disk passes from "0" to "9" and automatically reëngaging the same with the next stop 64, which is one of the multiplication-stops and holds the machine in engagement therewith during and merely during one complete revolution. The result is that the button 27 is moved back one figure and the dividend restored to its proper condition for further subtraction. The devices for accomplishing these results are as follows: The extreme left-hand numeral-disk, Figs. 3 and 5, is provided with a pin 89, extending from its left-hand face and adapted to engage the upper recess of a rocking segment 90, which segment is pivotally supported in any suitable manner in the carriage and is provided with a lower segment 90', engaging a segment 91, fast on a rocking shaft 66, to which the pawl 65 is secured. Of course these parts are so arranged that they are operative only when the left-hand numeral-disk passes from "0" to "9" and will then coact to rock the shaft 66 and throw the pawl 65 over from the division-stop 63 and into engagement with the next multiplication-stop 64. This movement will of course throw the numeral-disk cog 22 out of engagement with the subtracting-cog 19 and into engagement with the adding-cog 18, and thus start the machine multiplying; but during the first multiplication or addition the same extreme left-hand numeral-disk 23 will be moved back from "0" to "9," which will rock the pawl 65 back and out of engagement with the stop 64, so that the carriage will now be moved by its spring to the next division-stop 63. This will return the parts to their proper position for continuation of the division, the carriage having moved one complete step to the left, or the distance from one stop 63 to the next stop 63. The machine will thus continue till the division is completed, when the quotient will be indicated by the buttons 27 and the remainder will appear in the apertures 24. The device described is a distinct invention itself, and I do not limit the use of it to the purpose described. I ought to add, possibly, that when the machine is employed for multiplication the double segment 90 will not be rocked, since in multiplication the left-hand slot 26 should not be utilized, as the machine should always in multiplication be started in such a position that the left-hand slot will never have to register more than nine, or, in other words, will never pass from "9" to "0."

In machines of this class it is preferable that the disks be not turned while the carriage is moving and that the carriage be not moved while the disks are being turned, and in order to insure this perfect operation the following device has been provided: Referring to Figs. 9 to 11, a strip 98 is supported on the spindle 66 along the length of the same, and at certain intervals this strip is provided with slots or recesses 100, and the edge of the carriage lying beneath the said strip is provided with similar recesses 99, which register exactly with the recesses 100 when the carriage is in a position to perform a calculation after having been moved a step. A star-wheel 96 is mounted on a stub-shaft 96' and provided with a pinion 95, which is turned one-sixth of its circumference by every rotation of the cog-segment 94, Figs. 9, 11, and 27, which latter rotates with the spindle 44. The arms of the star-wheel extend into the recesses 99 and 100. The shaft or spindle 66 is provided with a light spring tending to draw the same to the left of Fig. 3, the said spring being indicated by 68, and the spindle has a certain amount of play in the slot 67 of the carriage, so that when the pawl is in its proper position behind any one of the stops 63 or 64 the shaft or spindle will be subjected to a pull to the left by the main carriage moving spring 301, which is stronger than the spring 68, and the said shaft or spindle will move longitudinally in its bearings. This arrangement will allow the spring 68 to act to shift the position of the recessed plate or strip 98 when the pawl is not arrested, so that the recesses 99 and 100 will not register under these circumstances— i. e., while the carriage is in motion; but as soon as the carriage is properly stopped they will register, and the arm of the star-wheel 96, which is turned by the cog-segment 94 before the beginning of each addition or subtraction, may pass into them, where it remains until the next addition in the position shown in Fig. 27. In this position the arm prevents any movement of the carriage while the machine is calculating; but the movement of the plate or strip 98 relative to the edge of the carriage 97 99 would prevent the arm of the wheel 96 from entering the recesses until they register properly, and thus the spindle 44 cannot rotate until the parts of the carriage are in proper registration—i. e., until the carriage has been properly adjusted. If the machine is at rest—i. e., if axis 13 is stopped by the control-lever 25, Fig. 8, (its cam-lug 76 engaging the stop 77 of the drum 78,)—the catch 94 on the axis 44, Fig. 27, will be stopped when being in gear with the cog 95 of the star-wheel 96. The star-wheel remains then in the position shown in Fig. 10, allowing a movement of the carriage.

In order to bring all the numeral-disks 23 back to their initial or zero positions, each disk 23 is provided with a cog 104, having a toothless portion 105, Figs. 9 to 11, and mounted on a common spindle 101 are a series of similar cogs 102, having also a toothless portion 103. This shaft or spindle 101 may be turned by means of the crank-handle 106 and bevel-gearing 107, and when turned it will turn all the cogs 104 of the numeral-disks until the toothless parts 103 and 105 of each pair of cogs are opposite each other, as illustrated in Fig. 10, when all the disks will be at the initial positions.

In connection with the operating-lever 25$^h$ and 84 it should be mentioned that the gear 86 is advantageously coupled to the gear 87 in one direction only, so that it will only operate to move the carriage to the right, allowing it to move freely to the left when the mechanism for performing the multiplication and division is in operation. This could be effected by ordinary ratchet-teeth and spring-bearings for one of the said gears, as indicated at $d$ in Fig. 4. This is not absolutely necessary, since the mechanism would work even if the two gears were rigidly connected; but in this case the carriage could only be returned when or after it had performed several steps in the division or between the stops 63 and 64. The free movement to the left is insured, because when the lever 25$^h$ is in the position to divide, the teeth 85 of the enlarged part and segment of lever 84 are just out of engagement with the teeth of the pinion 86, the lever 25$^h$ being over at the extreme left of the slot.

I will now describe my preferred form of mechanism for adjusting the decimal-point and will refer more especially to Figs. 1, 6, 13 to 16. Over and between the numeral-disks 23 and their apertures 24 is arranged a series of slots 209', in each of which is arranged a button 209. Similarly, between the slots 26 is arranged another series of slots 207', in each of which is a button 207. Again, between the slots 5 is arranged another series of slots 204', in each of which is a button 204. Evidently in addition and substraction the decimal-point does not change its position, and consequently the position of the decimal-point may be carried in the memory or may be indicated by pulling down any one of the buttons 209 above mentioned. In multiplication and division, however, the position of the decimal-point must be adjusted, and I provide for this adjustment, preferably by the following mechanism: Each button 204 projects through its slot 204' and is arranged to slide in a separate slot 201', arranged in a common rail 201. This rail is provided at each end with a short rack 215, in engagement with which at each end is suitably mounted a pinion 216, these pinions 216 being rigidly connected to a common spindle 217, extending along under the rail 201 and adapted to be simultaneously operated. As a result, if one end of the rail or any portion of the rail 201 is pushed or moved in either direction a parallel motion of the rail will be insured by these racks and pinions, which will result in a simultaneous and parallel movement of the rail 201 and each of the slots 201'. Each button 204 is provided with a spring-bar 211, rigidly secured thereto, and consequently adapted to slide backward and forward in a slot 201'. It is furthermore provided with wedge 218, with which corresponds a wedge 219 of the bar 201. Consequently any movement of the rail 201 will carry with it all these bars 211. The details of construction of these bars 211 and their functions will be described later. At the left-hand end of the rail 201 is provided an arm 214, rigidly secured thereto and having at its forward end an upwardly-turned cam-surface 202 and an upwardly-turned hook 203. Evidently if this bar 214 is pushed back it will also force back the rail 201 and all the spring-bars 211. These spring-bars 211 are preferably of elastic material and may be pushed so that one of the wedges will slide past the other by reason of the resiliency of the bars; but when once past, the button would have to be depressed by hand in order to enable the wedges to be again brought with their slanting surfaces one against the other. The buttons of the rows $a$ and $b$ are provided with similar spring-bars 213 and 212. These bars are mounted on the under side of the cover of the carriage and provided with wedges 222 and 221, respectively, engaging similar inclined surfaces 223 and 220 of the under side of the cover, over which said wedges may be pushed, as described with reference to the bars 211. Any suitable means may be provided for guiding all the said bars on the carriage and casing. When multiplication or division is being performed by the machine, the downwardly-turned cams of the bars 212 and 213 will pass through and coöperate with the hooks and cams of the bars 211 and bar 214 on the stationary part of the casing 1 in a certain manner which will now be described. In their position of rest—i. e., when no decimal-point is desired—the cams 210 pass by outside the hooks 206, while the cams 208 will pass between the cam 202 and the hook 203 of the bar 214 of the rail 201. In multiplying, as previously explained, the numbers are adjusted in the rows $b$ and $c$, the multiplicand being adjusted in the row $c$ and the multiplier in the row of slots $b$, and in order to have the decimal-point in the result one each of the buttons 204 and 207 will have to be pushed forward. The decimal-point in the multiplicand will be indicated by pushing one of the buttons 204 of the row $c$ between the proper figures of the same, and the decimal-point in the multiplier will be indicated by pulling down the corresponding button 207 of the row $b$. By advancing one of the buttons 204, with its bar 211, its hook 206, will lie behind the cam 210 of the bar 213 when the carriage is moved to the left, and by moving a button 207 and its corresponding bar 212 down its cam 208 will no longer be able to pass freely through between the cam 202 and the hook 203 of the bar 204 of rail 201 when the carriage is moved, but will press back the cam, and with it the rail 201, as it passes through between the parts. Thus, for instance, supposing the multiplicand—say a sum containing three figures—to have been adjusted in the row $b$, and the multiplier, a sum of two figures, in row $c$, and that the decimal is marked by shifting the third button 207 down, Fig. 14, and the second button 204 up, the following operation will take place: The first and second cams 208 will pass through between the cam 202 and the hook 203 without action, but the third cam 208 after the carriage has moved two steps and is moving the third will contact with and push back the cam 202 as it passes therethrough. Thus the arm 214 will move back the rail 201 and all the arms 211. Now the second bar 211 had been advanced so that the neck of its button 204 is in the upper end of the slot 201' of the rail 201 and its wedge 218 locked with the wedge 219, and consequently its hook 206 advanced. At the moment when the extended cam 208 crosses through between the cam 202 and the hook 203 of the bar 214 of the rail 201 the extended hook 206 of the bar 211 (in this case the second bar 211) will evidently engage with the cam 210 of the bar 213 opposite thereto, (in this case the fourth bar 213,) and as the depressed cam 208 of the bar 212 forces down the bar 214 and the rail 201 and all the bars 211 the extended bar 211 (in this case the second) will with its hook 206 pull down the said bar 213, whose cam 210 is in engagement therewith, (in this case the fourth bar,) and consequently pull down the button 209, attached thereto. For division the numbers of the dividend and divisor are adjusted in the rows *a* and *c*, as previously described, and in order to have the decimal-point in the result the buttons 204 and 209 must indicate the decimal-points in these numbers. As already explained, by shifting a button 204 the corresponding bar 211 is shifted so that its hook will pass behind the cam of a bar 213 if the latter is not shifted. By shifting a button 209, however, the corresponding cam 210 will no longer be able to pass through freely between the hook 206 and the cam 205 of the advanced bar 211, Fig. 15, but will press the latter back in passing through. This will have the effect of pushing back the rail 201 with the arm 214, and the hook 203 on the same will shift the cam 208, which happens to be within the reach at the moment. This pulls the corresponding button 207 forward and marks the decimal-point in the row *b* in which the result appears. Thus, for instance, if a four-figure sum had been adjusted in the row *a* and a double figure in the row *c*, Fig. 22, the fourth decimal-point 209 pulled down and the second decimal-point pushed up, the following operation would take place: Evidently all the cams 210 of the bars 213 which have not been depressed by the movement of their buttons 209 will pass through between the cam 205 and the hook 206 of the advanced bar 211 without coacting therewith; but so soon as the advanced cam 210 attempts to pass this advance bar 211 it will engage with the cam 205 of said bar 211 and will force said bar 211 and also the rail 201 and also the bar 214 back, which will result in the hook 203 of the bar 214 engaging with and pulling down the cam 208 of the bar 212, and consequently said bar 212 and its button 207, which happens to be opposite said bar 214 at the moment that the depressed cam 210 is passing the advanced bar 211. In other words, in the present instance after the carriage has performed three steps the cam 210, Fig. 15, which had been shifted will push back the cam 205 of the second arm 211, and with it rail 201, which by means of its hook 203 pulls back the third cam 208, which is in engagement with it at the moment the cam 205 of the second arm 211 is pushed back by the fourth cam 210, and thus marks the decimal-point at the hundreds position in the result, which is correct, because thousands were being divided by tens.

The devices for indicating the decimal-point might be used for adding or subtracting lengths or spaces indicated on two members one of which is slidable with relation to the other. For such a purpose the casing and the carriage, respectively, would represent these two members. The lengths to be added or subtracted would consist of one or more times the distance apart at which the buttons 204 or 207 are located. Counting from the left, the termination of the first space marked by buttons would be the first button 204 herein illustrated. Assuming that a length equal to three spaces was to be added to a length equal to two spaces, then the first-named length might be indicated by counting the buttons 204 from the left and setting the third button and the buttons 207 from the left and setting the second button. Now by moving the members with relation to each other in the manner as described for multiplication the two lengths will be added together and a length equal to three plus two spaces minus one space. (Indicated by the automatic setting of the fourth button 209 from the left.) Because the devices are here arranged to indicate the decimal-point the sum less one space will be indicated; but by placing the single bar 214 at the beginning instead of the end of the first space, or, in other words, one space to the left, the result would be a length equal to the exact sum of the two set-up lengths. The subtraction of lengths might be accomplished by the manipulation of the parts in the manner described for indicating the decimal-point in division. In either operation the bar 214 will always be placed with relation to the first button 204, and by changing this position the result may be varied correspondingly. These devices being fully capable of use for adding and subtracting lengths in this manner, I do not desire to limit myself to their use as a decimal-point indicator.

In Figs. 17 to 22 a device is shown in modified form by means of which the tens, hundreds, &c., are shifted. As is the case with the device for this purpose previously described, the difficulty is to shift all the tens, hundreds, &c., when the disks show "999" and one is to be added or subtracted. As already explained, the adjustment of the tens takes place when the disks are moved from "9" to "0" for addition or from "0" to "9" for subtraction and at the second half of the revolution of the driving-shaft, so that in the event of the disk standing at "9 9 9" the continuous adjustment of the tens necessary on the addition of one would not take place—*i. e.*, the adjustment would take place on the right-hand numeral-disk, but no farther—because the other disks standing at "9," the preparations for the adjustment, which take place when the disks pass from "9" to "0," or, vice versa, when they are at "0" in subtraction to "9," would not yet have taken place, so that only one of the disks—to wit, the right-hand end one—would be moved. This disadvantage was obviated in the device described with reference to Fig. 3, in that the transmission of movement to the next-lying disks was effected directly by the longitudinal movement of the gears 50 and 51 owing to the movement of the shaft 37.

The device illustrated in Figs. 17 to 22 operates in the following manner: The tooth 121 turns the tooth 124, which is loosely mounted, by means of sleeve 123, on the shaft 122. The arm 140, which is rigidly connected to the tooth 124, will thus be turned to the left, Fig. 21, for addition and to the right, Fig. 22, for subtraction, and thus will couple the left-hand slide 125 to the bar 130 for addition and the right-hand slide 126 to the bar 131 for subtraction. The bars 130 and 131 are each provided with recesses 132 for each arm 140, and if no ten is to be further counted the arm 140 remains stationary between the two bars, Fig. 17. If, however, the ten is to be added by any of the numeral-disks, the tooth 121 of the numeral-disk 23 will have moved the arm 140 into one or other of the recesses of the bars 130 or 131. These bars are moved backward and forward in the direction of their length at each last half-revolution of the driving-spindle by means of cam-grooves and the segments 52, as previously described with regard to the spindle 37. The slides 125 and 126 are mounted to move on guide-rods 127 128, on which they are not rotatable, and each has a fork 129 formed at its boss, or thereabout, into which fork when a ten is to be registered a pin 183 is moved by the movement of the sleeve 123. Thus when one or other of the bars 130 or 131 is moved the slide 125 or 126 will be coupled to it and be moved with it. Each slide has an arm 135 and 134, (a pair of slides are provided for each numeral-disk 23, as will be readily understood,) which arm rests against a sleeve 133, provided with a tooth 133'. The sleeve is longitudinally movable, but keyed to the spindle 122, and when the corresponding slide is moved by the movement of the bar 130 or 131 the tooth 133' will be pushed forward under the cog 22 of the numeral-disk 23 and be ready for engagement therewith as soon as the spindle 122 is turned at the second half of the revolution of the driving-shaft, which takes place by means of similar driving mechanism to that described with reference to shaft 39. Thus during the first half of the main-shaft revolution or while the numeral-disks are being operated the slide will be coupled to one or other of the bars, according to whether addition or subtraction is being performed, and then as soon as the numeral-disks have stopped the tens are added or subtracted by the rotation of the spindle 122 at the second half of the revolution of the shaft and at the revolution of the spindle 122. In order, however, to simultaneously move a number of consecutive numeral-disks which are standing at "9 9 9" on the addition of one, the following device is employed: Loosely mounted on the spindle 21 is an arm 142, which serves to guide a horizontally-disposed bar 141, which extends through a boring in the next-lying numeral-disk between the figures "9" and "0", said bar of course rotating with the said disk. The right-hand end of the bar lies against one or other of the slides 125 or 126, according to whether addition or subtraction is being performed, and the free end at the opposite side of the next numeral-disk lies against the corresponding slide of the next pair of slides. Thus when consecutive disks are standing at "9" or "0" the slide of the first disk which will have been moved and prepared for the adjustment of the ten will operate the slide of the next following disk, and so on, by means of the bars 141. After each adjustment has been completed the arm 140 is returned to its position between the two bars 125 and 126 by means of the sliding bar 136, having recesses with inclined surfaces 136' and mounted to slide in the bars 130 and 131, these bars being operated by cam-drums in the manner previously described with reference to the shaft 37. The gears 113 are returned to their initial position after each operation by means of the pins 130', which engage in grooves 139' when the sleeves have been turned. The movement of the bar 139, which carries the pins 130', is effected by cam-grooves.

What I claim as new is—

1. The combination with registering devices, of operating devices, adapted when operated, automatically to move two or more of said registering devices each to an extent independently predetermined; transferring devices adapted when put into operation automatically and simultaneously to transfer the tens from all said registering devices which have reached a given position; a motor; means for connecting said motor with said operating devices and keeping the same in connection therewith until the desired operation is completed, means for automatically disconnecting said motor from said operating devices; means for automatically putting said transferring devices into operation after said disconnection of said motor from said operating devices, means for putting said motor into operation and means for automatically stopping the machine after the completion of its operation.

2. The combination with registering devices, of operating devices adapted when operated, automatically to move two or more of said registering devices, each to an extent independently predetermined; transferring devices adapted when put into operation automatically and simultaneously to transfer the tens from all said registering devices which have reached given position; a motor; means for connecting said motor with said operating devices and keeping the same in connection therewith until the said desired operation is completed; means for thereafter automatically disconnecting said motor from said operating devices, means for automatically putting said transferring devices into connection with said motor after the disconnection of said motor from said operating devices; means for putting said motor into operation, and means for automatically stopping the machine after the completion of its operation.

3. In a calculating-machine, the combination with a movable carriage containing registering devices, of means for operating the registering devices and means for preventing any movement of said carriage out of its normal position during the movement of said registering devices by said operating means.

4. In a calculating-machine, the combination of means for setting up a multiplicand of two or more digits, means for setting up a multiplier of two or more digits, numeral-wheels, means to add said multiplicand to said numeral-wheels successively a number of times corresponding to each digit of the multiplier and including a movable carriage having said numeral-wheels mounted thereon, and means for preventing movement of said carriage during any of such additions.

5. In a calculating-machine, the combination of means for setting up a divisor of two or more digits, numeral-wheels on which the dividend is set up, means to subtract said divisor from the dividend set up on said numeral-wheels successively a number of times represented by each digit of the quotient and including a movable carriage having said numeral-wheels mounted thereon, and means for preventing movement of said carriage during any of such subtractions.

6. In a calculating-machine, the combination with registering devices mounted on a movable carriage, of operating devices adapted to operate the registering devices to register either additions or subtractions dependent upon the position of said carriage with relation to the said operating means, and means for preventing movement of said carriage during such an addition or subtraction.

7. In a calculating-machine, the combination with a casing, a motor and registering devices driven by said motor, of a carriage movable independently of said motor with relation to the casing, and means for preventing any movement of said carriage during the movement of said registering devices.

8. In a calculating-machine, the combination of means for setting up a multiplicand of two or more digits, numeral-wheels, a motor, means driven by said motor to add said multiplicand to said numeral-wheels, a carriage movable independently of the motor and having the numeral-wheels mounted thereon for moving them to denominations of different order, and means for preventing any movement of the carriage during the performance of an addition.

9. In a calculating-machine, the combination of means for setting up a divisor of two or more digits, numeral-wheels on which the dividend is set up, a motor, means driven by said motor to subtract said divisor from said numeral-wheels, a carriage movable independently of the motor and having numeral-wheels mounted thereon for moving them to denominations of different order, and means for preventing any movement of the carriage during the performance of a subtraction.

10. In a calculating-machine, the combination with a casing containing operating mechanism, of a carriage movable with relation thereto, means for retaining said carriage in its position during an operation and for releasing the carriage at the end of an operation, and means coöperating with the releasing means to stop the operating mechanism during the movement of the carriage.

11. In a calculating-machine, the combination with a casing containing operating mechanism, of a carriage movable with relation thereto, means for retaining said carriage in its position during an operation and for releasing the carriage at the end of an operation, means for stopping said operating means after the end of a calculation, and means for placing the stopping means into operative position during the calculation.

12. In a calculating-machine capable of adding and subtracting, the combination of means for setting up a number of two or more digits, numeral-wheels, means to add the number set up to the numeral-wheels, a shiftable carriage having the numeral-wheels mounted thereon and means for turning said numeral-wheels in reverse direction, i. e., to subtract after a shifting movement of the carriage has taken place.

13. In a calculating-machine capable of adding and subtracting, the combination of numeral-wheels, positively-operating carrying mechanism, and operating devices for adding numbers to said numeral-wheels, a shiftable carriage having said numeral-wheels mounted thereon and means for turning said numeral-wheels in reverse direction, i. e., to subtract after a shifting movement of the carriage has taken place.

14. In a calculating-machine capable of multiplying and dividing, the combination of a shiftable carriage, means adapted automatically to shift the carriage, numeral-wheels mounted on the carriage, and operating devices to operate the numeral-wheels including means for reversing the rotation of the numeral-wheels after a shifting movement of carriage has taken place.

15. In a dividing-machine, the combination of means for setting up a divisor of two or more digits, a shiftable carriage, numeral-wheels on which the dividend is set up mounted on the carriage, and operating devices to operate the numeral-wheels including means for reversing the rotation of the numeral-wheels after a shifting movement of the carriage has taken place.

16. The combination, in a machine capable of adding and subtracting, of a movable carriage, a registering-wheel carried thereby, reversely-moving operating-wheels, and means for moving the carriage and thereby engaging either of the operating-wheels with the registering-wheel.

17. In a multiplying-machine, the combination of devices for setting up a multiplicand, means for indicating the position of the decimal-point in said multiplicand, devices for setting up the multiplier, means for indicating the position of the decimal-point in said multiplier and means adapted when set into operation automatically to carry out the operation of multiplication, register the result thereof and adjust said decimal-point to accord with said result.

18. In a multiplying-machine, the combination of devices for setting up a multiplicand, devices for setting up a multiplier of two or more digits, and means adapted, when put into operation, to automatically and successively add said multiplicand a number of times corresponding with the multiplier, and to register the result thereof.

19. In a multiplying-machine, the combination with devices for setting up a multiplicand and devices for setting up a multiplier, of a movable carriage containing registering devices, means adapted when put into operation automatically to add the multiplicand a number of times to correspond with each figure of the multiplier and means for automatically moving said carriage and step by step bringing it successively into engagement with said means for causing successive additions.

20. In a dividing-machine, the combination with devices for setting up a dividend, devices for setting up a divisor and means adapted when once put into operation to automatically carry out the operation of division and register the result thereof whether the quotient comprises one or more digits.

21. In a dividing-machine, the combination with devices for setting up a dividend, devices for setting up a divisor of two or more digits, and means adapted, when once put into operation, to automatically carry out the operation of division, and register the result thereof whether the quotient comprises one or more digits.

22. In a dividing-machine, the combination of devices for setting up a dividend, means for indicating the position of a decimal-point in said dividend, devices for setting up a divisor, means for indicating the position of a decimal-point in said divisor, and means adapted when set into operation to automatically carry out the operation of division, register the result thereof and adjust said decimal-point to accord with said result.

23. In a dividing-machine, the combination of devices for setting up a dividend, devices for setting up a divisor and means adapted when once put into operation to automatically and successively subtract said divisor a number of times automatically regulated and dependent upon the dividend, and to register the result thereof.

24. In a dividing-machine, devices for setting up a dividend, devices for setting up a divisor and arranging the same under said dividend and in parallel columns therewith starting from the left, means adapted when put into operation automatically to move the devices representing the dividend step by step and to the extent of one column thereof, means adapted automatically when put into operation to subtract the divisor from the figures of said dividend arranged in columns above said divisor until said dividend reaches zero, means for automatically registering the number of subtractions necessary to produce the above result, means adapted automatically at the end of each said result to readd to the dividend the remainder subtracted during the last said operation of subtraction and to move back the said registering devices one figure, and means for automatically stopping the machine at the end of the calculation.

25. The combination with a calculating-machine, of registering devices, means adapted to perform the calculation of addition and register the result thereof on said registering devices, and means comprising a single control-lever adapted automatically to put said machine into operation and reverse the same or cause it to perform the calculation of subtraction.

26. In a machine capable of performing the operations of addition and subtraction, the combination of means for setting up two numbers, a control-lever, and means whereby a single movement of the control-lever will adjust and release the machinery for the automatic performance of addition, or subtraction, respectively.

27. In a calculating-machine, the combination of a casing containing operating devices, a carriage containing registering devices and movable with regard to said casing, and means comprising a single control-lever adapted to change the position of said carriage with relation to said casing, and thereby causing said operating means to move said registering devices to register the result of the calculation of either addition or subtraction, depending upon the relative position of said carriage with reference to said casing.

28. The combination with registering devices, of operating means for simultaneously moving two or more of the same and transferring means for afterward simultaneously and positively transferring from a lower to a higher denomination.

29. The combination with registering devices, of operating means for simultaneously moving two or more of the same, and transferring means for afterward simultaneously transferring from a lower to a higher denomination from all of said registering devices, which either have reached a given position, when having been turned by the operating means, or are reaching this given position during the turning by the transferring means.

30. The combination with registering devices adapted by reverse movements of the same device to register additions and subtractions, of operating means for simultaneously moving two or more of the same and transferring means for simultaneously transferring from a lower to a higher denomination.

31. The combination with registering devices adapted by reverse movements of the same device to register additions and subtractions, of operating means for simultaneously moving two or more of the same, and transferring means for simultaneously and positively transferring from a lower to a higher denomination.

32. The combination with registering devices adapted to register additions and subtractions, of operating means for simultaneously moving two or more of the same, and transferring means for simultaneously and positively transferring from a lower to a higher denomination from all of said registering devices, which either have reached a given position, when having been turned by the operating means, or are reaching this given position, during the turning by the transferring means.

33. In a calculating-machine, the combination with registering devices, of operating means for moving the same, carrying means actuated when one of the registering devices has reached a given position, and adapted to produce a further movement of the next registering device after the operating means have ceased to move, and means for producing a change of the registering mechanism during the transferring from a lower to a higher denomination, whereby a simultaneous movement of two or more registering devices will take place when one of them has reached a given position.

34. A transferring mechanism for calculating-machines, comprising a plurality of numeral-wheels each provided with a single tooth, a plurality of other wheels having single teeth mounted on a common shaft and rotating with the same, means actuated by the single teeth of the numeral-wheels, to cause connections between the numeral-wheels and the teeth rotating with the common shaft, so that these teeth can rotate the wheels, and means adapted to enable the single tooth of each numeral-wheel directly to rotate the next left numeral-wheel, during a rotation caused by the teeth on the common shaft.

35. In a calculating-machine, a plurality of numeral-wheels loosely mounted on a common shaft, a gear for each numeral-wheel, and a sliding bar movable parallel to the shaft and carrying a series of stops adapted to engage in the teeth of the gears and to stop the same either at the same time or successively dependent upon the arrangement of the stops.

36. The combination in a calculating-machine, of a plurality of numeral-wheels provided with cogs and geared together, one after the other for simultaneous movement, with means for correcting the play of the gears by adjusting them one after the other.

37. The combination, in a calculating-machine, of a plurality of numeral-wheels provided with cogs and geared together, one after the other for simultaneous movement, with means for positively correcting the play of the gears by adjusting them, one after the other, in a forward direction.

38. In an adding and subtracting machine, the combination with registering devices, of operating means for the same comprising two gears continuously operated in opposite directions and adapted for alternately engaging the same registering device for addition or subtraction respectively.

39. In a calculating-machine, means for operating the registering devices comprising a plurality of pairs of gears, the shafts of all the gears being in one line, and each pair connected with one of the operating means, and turned by them in opposite directions.

40. The combination, in a machine for simultaneously adding numbers of two or more digits, with operating means of registering devices, one means bodily movable with respect to the others, and adapted to register additions and subtractions, means for transferring the tens in additions and subtractions and means for putting said transferring devices into operation either for additions or subtractions dependent upon the position of the operation means with relation to the registering devices.

41. In a calculating-machine capable of performing additions and subtractions, the combination with a casing, of a carriage movable with regard thereto, a row of stops adjusting the carriage when additions are performed, and another row of stops adjusting the carriage when subtractions are performed.

42. In a calculating-machine, the combination of a casing, with a carriage, means adapted when put into operation to perform either additions or subtractions dependent upon the position of the carriage with regard to the casing, a yoke swinging upon its axis and means adapted to determine the position of the carriage by the different positions of the yoke.

43. In a machine capable of performing the operations of multiplying and dividing, the combination with a casing and a carriage movable with relation thereto, of stops for adjusting the carriage, and means adapted to render a part of the stops ineffective.

44. In a calculating-machine, the combination with a casing, of a carriage movable with relation thereto, two rows of stops for adjusting the carriage, one row being for addition and the other for subtraction, and means for rendering part of the stops ineffective.

45. In a calculating-machine, the combination of a motor, calculating mechanism driven by the motor, means for stopping the motor, and means for releasing the motor for a single operation, or a plurality thereof, as may be desired.

46. In a multiplying-machine, the combination of means for setting up a multiplicand of two or more digits, registering-wheels, means to add the multiplicand set up to the registering-wheels a number of times corresponding to each digit of the multiplier and including a carriage having the registering-wheels mounted thereon, means for moving the carriage in one direction and means for preventing such motion.

47. In a multiplying-machine, the combination of means for setting up a multiplicand of two or more digits, registering-wheels, means to add the multiplicand set up to the registering-wheels and including a carriage having the registering-wheels mounted thereon, means for preventing movement of the carriage until it has to be moved and means for then releasing the carriage automatically.

48. In a multiplying-machine, the combination of means for setting up a multiplicand of two or more digits, registering-wheels, means to add the multiplicand set up to the registering-wheels a number of times corresponding to each digit of the multiplier and including a carriage having the registering-wheels mounted thereon, and means adapted automatically to move the carriage during the performance of multiplication.

49. In a multiplying-machine, the combination of means for setting up a multiplicand of two or more digits, registering-wheels, means to add the multiplicand set up to the registering-wheels a number of times corresponding to each digit of the multiplier and including a carriage having the registering-wheels mounted thereon, and means adapted automatically to move and to arrest the carriage during the performance of multiplication.

50. In a multiplying-machine, the combination of means for setting up a multiplier, means for setting up a multiplicand, numeral-wheels, means to perform the multiplication with one digit of the multiplier and to register it on the numeral-wheels, a carriage having the numeral-wheels mounted thereon, means for moving the carriage and means controlled by the setting-up devices of the multiplier for retaining the carriage in its position until the completion of each digit operation and for releasing the carriage at the end of such operation.

51. In a multiplying-machine, the combination of means for setting up a multiplier, means for setting up a multiplicand, numeral-wheels, means to perform the multiplication with one digit of the multiplier and to register it on the numeral-wheels, a carriage having the numeral-wheels mounted thereon, means for moving the carriage and means controlled by the setting-up devices of the multiplier for stopping the carriage at the proper digit for operation.

52. In a multiplying-machine, the combination with a casing, of a carriage movable with relation thereto, devices on the carriage for setting up a multiplier of two or more digits by moving these devices out of their initial positions, operating means in the casing to return the said setting-up devices to their initial positions during a calculation, and means in the casing for stopping the operating devices when the setting-up devices have reached their initial positions.

53. In a multiplying-machine, the combination with a casing, of a carriage movable with relation thereto, devices on the carriage for setting up a multiplier by moving these devices out of their initial positions, operating means in the casing to return said setting-up devices to their initial position during an operation, and means for releasing the carriage when one of the setting-up devices reaches its initial position.

54. In a multiplying-machine, the combination of means for setting up a multiplicand, means for setting up a multiplier, and means adapted after having been released, to automatically perform the operation of multiplication, and to register the result thereof.

55. In a multiplying-machine, the combination of means for setting up a multiplicand, means for setting up a multiplier of two or more digits, and means adapted when put into operation automatically to perform the operation of multiplication and to register the result thereof.

56. In a multiplying-machine performing multiplication by repeated additions, the combination of means for setting up a multiplicand, means for setting up a multiplier of two or more digits, and means automatically to regulate the number of additions in accordance with the multiplier set up.

57. In a calculating-machine, the combination with a casing, and a carriage movable with relation thereto, of means mounted on the carriage for registering the number of additions or subtractions by their forward or backward movement, respectively, dependent upon the position of the carriage with relation to the casing.

58. In a dividing-machine, the combination of means for setting up a divisor of two or more digits, numeral-wheels on which the dividend is set up, means to subtract the divisor set up from the numeral-wheels a number of times dependent upon each digit of the quotient, including a carriage having the numeral-wheels mounted thereon, means for moving the carriage in one direction and means for preventing such motion.

59. In a dividing-machine, the combination of means for setting up a divisor of two or more digits, numeral-wheels on which the dividend is set up, means to subtract the divisor set up from the numeral-wheels, including a carriage having the numeral-wheels mounted thereon, means for preventing movement of the carriage until it has to be moved and for releasing the carriage automatically at such moment.

60. In a dividing-machine, the combination of means for setting up a divisor of two or more digits, numeral-wheels on which the dividend is set up, means to subtract the divisor set up from the numeral-wheels a number of times dependent upon each digit of the quotient, including a carriage having the numeral-wheels mounted thereon and means adapted automatically to move the carriage during the performance of division.

61. In a dividing-machine, the combination of means for setting up a divisor of two or more digits, numeral-wheels on which the dividend is set up, means to subtract the divisor set up from the numeral-wheels a number of times dependent upon each digit of the quotient, including a carriage having the numeral-wheels mounted thereon and means adapted automatically to move and to arrest the carriage during the performance of division.

62. In a calculating-machine, the combination with registering mechanism, capable of performing addition and subtraction, comprising numeral-disks, of transferring mechanism, and means connected with the numeral-disk of higher order for changing the operation from subtraction to addition.

63. In a calculating-machine, the combination with registering mechanism, capable of performing addition and subtraction, of transferring mechanism and mechanism substituted for the carrying mechanism of higher order for changing the operation from subtraction to addition.

64. In a dividing-machine, the combination with registering devices capable of performing addition and subtraction, of means for changing the action of the machine from adding to subtracting or from subtracting to adding if one of the registering devices passes a given position.

65. In a dividing-machine, the combination of a casing, with a carriage movable with respect thereto, registering devices, and means adapted to cause a movement of the carriage if one of the registering devices passes a given position.

66. In a dividing-machine, the combination of a casing, with a carriage movable with respect thereto, means preventing a movement of the carriage, registering devices, and means adapted automatically to release the carriage if one of the registering devices passes a given position.

67. In a calculating-machine, means for performing division including a casing with a carriage movable with respect thereto, and means adapted automatically to cause a movement of the carriage, if the machine indicates too great a quotient.

68. In a calculating-machine, means for performing division including means to try a quotient and means adapted to automatically correct the error if the machine tries too great a quotient.

69. In a calculating-machine, means for performing division including means to try a quotient, means adapted to correct the error if the machine tries too great a quotient, and means adapted automatically to adjust the machine for the continuation of the calculation on the next lower digit, after the error has been corrected.

70. In a calculating-machine, the combination with registering-wheels, of operating devices for moving the same, a movable carriage having the registering-wheels mounted thereon, and means for preventing movement of the operating devices during the movement of the carriage.

71. In a calculating-machine, the combination of means for setting up a multiplicand, means for setting up a multiplier of two or more digits, registering-wheels, operating devices for moving the same, a movable carriage having the registering devices mounted thereon, and means for preventing any movement of the operating devices during the movement of the carriage.

72. In a calculating-machine, the combination with registering-wheels, of operating devices for moving the same, a movable carriage having the registering devices mounted thereon, means for retaining the carriage in its position during the movement of the operating means, and for releasing the carriage at the end of such movement, and means for preventing any movement of the operating devices during the movement of the carriage.

73. In a calculating-machine, the combination with means for performing multiplication by repeated additions including registering devices, of a motor for actuating such means, means for stopping the motor after an addition, and means for releasing said stopping devices during an addition.

74. In a calculating-machine, the combination with means for performing division by repeated subtractions including registering devices, of a motor for actuating such means, means for stopping the motor after a subtraction and means for releasing said stopping devices during a subtraction.

75. In a calculating-machine, the combination with devices for the setting up of the decimal-point, one of them provided for each digit of the multiplicand or divisor, and each of them capable of an independent movement, of means for imparting to these devices another common movement.

76. The combination, in a calculating-machine, of means for setting up the decimal-point in the dividend, means for setting up the decimal-point in the divisor, and means adapted when put into operation automatically to indicate the place of the decimal-point in the quotient.

77. The combination, in a calculating-machine, of devices adapted when put into operation to perform the calculation of either addition or subtraction or multiplication or division, and to register the result of each of said calculations, and means, comprising a single control-lever, adapted at will to put said machine into operation for the automatic performance of any one of said calculations.

78. The combination, in a calculating-machine, with means for setting up two figures, of devices adapted when put into operation automatically to perform the calculation of either addition or subtraction or multiplication or division with the figures set up, and to register the result of each of said calculations, automatically indicating the decimal-point in the product or quotient.

79. In a calculating-machine, the combination with means for registering a multiplier or quotient of two or more digits, of a motor, operating devices driven by the motor, stopping devices to stop the operating devices at the end of the operation, means for placing said stopping devices in operative position during the operation, and means for engaging said stopping devices at the end of the operation, if in operative position.

80. In a multiplying-machine, the combination of means for setting up a multiplicand, means for setting up a multiplier, means for performing the multiplication, a control-lever, means to stop the machine and means to adjust and release the machine for multiplication by a single movement of the control-lever.

81. In a dividing-machine, the combination of means for setting up a divisor, means for setting up a dividend, means for performing the division, a control-lever, means to stop the machine and means to adjust and release the machine for division by a single movement of the control-lever.

82. The combination, in a calculating-machine, of means for setting up a multiplicand and a multiplier means for setting up a decimal-point in one of the same, means for performing the multiplication and indicating the product, and means adapted when put into operation to automatically indicate the place of the decimal-point in the product.

83. The combination, in a calculating-machine, of means for setting up a multiplicand and a multiplier, means for setting up a decimal-point in both multiplicand and multiplier, means for performing the multiplication and indicating the product, and means adapted when put into operation to automatically indicate the place of the decimal-point in the product.

84. In a dividing-machine the combination with devices for setting up a divisor, devices for setting up a dividend which contains said divisor more than ten times, and means adapted when once put into operation to automatically carry out the operation of division and indicate the correct quotient.

85. In a dividing-machine the combination with devices for setting up a divisor, devices for setting up a dividend which contains said divisor more than ten times and means adapted when once put into operation to automatically carry out the operation of division and indicate the correct quotient comprising means for performing division corresponding to one figure of the quotient and automatically afterward performing division corresponding to the other figure of the quotient.

In witness whereof I have hereunto set my hand in presence of two witnesses.

ALEXANDER RECHNITZER.

Witnesses:
 HENRY HASPER,
 WOLDEMAR HAUPT.